United States Patent [19]
Abe

[11] Patent Number: 5,940,794
[45] Date of Patent: Aug. 17, 1999

[54] BOUNDARY ESTIMATION METHOD OF SPEECH RECOGNITION AND SPEECH RECOGNITION APPARATUS

[75] Inventor: Yoshiharu Abe, Kamakura, Japan

[73] Assignee: Mitsubishi Denki Kabushiki Kaisha, Tokyo, Japan

[21] Appl. No.: 08/679,861

[22] Filed: Jul. 15, 1996

Related U.S. Application Data

[63] Continuation of application No. 08/129,946, Sep. 30, 1993.

[30] Foreign Application Priority Data

| Oct. 2, 1992 | [JP] | Japan | 4-264678 |
| Apr. 26, 1993 | [JP] | Japan | 5-099402 |

[51] Int. Cl.$^6$ .................................................... G10L 5/06
[52] U.S. Cl. ............................................ 704/253; 704/240
[58] Field of Search ................................ 395/2.62, 2.49, 395/2.6–2.66

[56] References Cited

U.S. PATENT DOCUMENTS

| 4,803,729 | 2/1989 | Baker ........................................ 381/43 |
| 4,805,100 | 2/1989 | Ozeki . | |
| 4,881,266 | 11/1989 | Nitta et al. ................................ 381/43 |
| 4,977,599 | 12/1990 | Bahl et al. .............................. 395/2.65 |
| 5,305,442 | 4/1994 | Junqua ..................................... 395/2.62 |

OTHER PUBLICATIONS

"A Neural Network for Phonetic Segmentation of Continuous Speech", Acoustical Society of Japan Proceedings, 2–P–6, Oct. 1988.

"Phoneme Segmentation Expert System Using Spectrogram Reading Knowledge", Electronic Information Communications Association of Japan Transactions D–II vol. J73–D–II, No. 1, pp. 1–10, Jan. 1990.

"Segmentation of Continuous Speech by HMM and Bayesian Probability", Electronic Information Communications Association of Japan Transactions D–II vol. J72–D–II, No. 1, pp. 1–10, Jan. 1989.

"Phonemic Units Segmentation in Various Phonetic Environments", Electronic Information Communications Association of Japan Transactions D–II vol. J72–D–II, No. 8, pp. 1221–1227, Aug. 1989.

"A Phoneme Segmentation Parameter Based on the Onset–Sensitive Auditory Neuron Model", Electronic Information Communications Association of Japan Transactions A vol. J71–A, No. 3, pp. 592–600 Mar. 1988.

(List continued on next page.)

*Primary Examiner*—Allen R. MacDonald
*Assistant Examiner*—Robert C. Mattson
*Attorney, Agent, or Firm*—Wolf, Greenfield & Sacks, P.C.

[57] ABSTRACT

A boundary estimation method capable of readily learning the probability of existence of a boundary in speech and a speech recognition apparatus with high precision and less model calculation. In a learning mode, an estimator estimates distributions of boundary samples and non-boundary samples. In an estimation mode, a likelihood calculator calculates a likelihood of a boundary from a boundary probability density and a non-boundary probability density. In the speech recognition apparatus, a feature extractor analyzes the input speech to convert it into feature parameters of time series, a boundary detector detects phonetic boundary equivalent areas in the input speech from the output of the feature extractor, a model calculator prepares a plurality of phonetic model series corresponding to the feature parameters and restricts a time when the boundaries of the phonetic model series are formed to the phonetic boundary equivalent areas detected by the boundary detector, and a phonetic series transform selects suitable phonetic model series corresponding to the input speech from the result of the model calculator.

18 Claims, 38 Drawing Sheets

OTHER PUBLICATIONS

"A Segmentation Algorithm for Connected Word Recognition Based on Estimation Principles", IEEE Transactions on Acoustics, Speech, and Signal Processing, vol. ASSP–31, No. 4, Aug. 1983.

"Development of an Acoustic–Phonetic Hidden Markov Model for Contiuous Speech Recognition", Ljolje et al., IEEE Transactions on Signal Processing, vol. 39, No. 1, pp. 29–39, Jan. 1991.

"Speech Recognition Using Time–Dependent Linear Phonetic–Context Model", Acoustical Society of Japan Proceedings, 2–P–27, Mar. 1990.

"Phonetic Segmentation by Mixture Continuous Parameter Models", Acoustical Society of Japan Proceedings, 2–Q–16, Oct. 1992.

On Robustness of the Mixture Density Segmentation Method to a New Speaker, Acoustical Society of Japan Proceedings, 2–4–7, Mar. 1993.

Thomas Parsons, Voice and Speech Processing, McGraw Hill 1986.

Plannerer et al., Recognition Of Demisyllable Based Units Using Semicontinuous Hidden Markov Models, IEEE 1992.

| PHONEME No. | START FRAME | END FRAME | PHONEME NAME |
|---|---|---|---|
| 0028 | 00005 | 00023 | # |
| 0000 | 00023 | 00033 | a |
| 0026 | 00033 | 00034 | r |
| 0000 | 00034 | 00046 | a |
| 0005 | 00046 | 00052 | y |
| 0002 | 00052 | 00055 | u |
| 0026 | 00055 | 00058 | r |
| 0002 | 00058 | 00068 | u |
| 0018 | 00068 | 00071 | *cl |
| 0021 | 00071 | 00074 | g |
| 0003 | 00074 | 00085 | e |
| 0027 | 00085 | 00091 | N |
| 0018 | 00091 | 00095 | *cl |
| 0023 | 00095 | 00098 | dj |
| 0001 | 00098 | 00104 | i |
| 0008 | 00104 | 00111 | cl |
| 0013 | 00111 | 00117 | ts |
| 0002 | 00117 | 00127 | u |
| 0004 | 00127 | 00139 | o |
| 0028 | 00139 | 00169 | # |
| 0014 | 00169 | 00181 | s |
| 0002 | 00181 | 00186 | u |
| 0018 | 00186 | 00188 | *cl |
| 0019 | 00188 | 00190 | b |
| 0003 | 00190 | 00199 | e |
| 0008 | 00199 | 00203 | cl |
| 0010 | 00203 | 00205 | t |
| 0003 | 00205 | 00213 | e |
| 0018 | 00213 | 00216 | *cl |
| 0023 | 00216 | 00220 | dj |
| 0001 | 00220 | 00227 | i |
| 0018 | 00227 | 00230 | *cl |
| 0019 | 00230 | 00232 | b |
| 0002 | 00232 | 00241 | u |
| 0027 | 00241 | 00248 | N |
| 0025 | 00248 | 00253 | n |
| 0004 | 00253 | 00261 | o |
| 0016 | 00261 | 00269 | h |
| 0004 | 00269 | 00286 | o |
| 0003 | 00286 | 00299 | e |
| 0025 | 00299 | 00305 | n |
| 0003 | 00305 | 00315 | e |
| 0023 | 00315 | 00321 | dj |
| 0001 | 00321 | 00326 | i |
| 0024 | 00326 | 00331 | m |
| 0000 | 00331 | 00340 | a |
| 0018 | 00340 | 00343 | *cl |
| 0021 | 00343 | 00345 | g |
| 0003 | 00345 | 00351 | e |
| 0008 | 00351 | 00357 | cl |
| 0010 | 00357 | 00359 | t |
| 0000 | 00359 | 00366 | a |
| 0025 | 00366 | 00370 | n |
| 0004 | 00370 | 00378 | o |
| 0018 | 00378 | 00382 | *cl |
| 0020 | 00382 | 00383 | d |
| 0000 | 00383 | 00390 | a |
| 0028 | 00390 | 00410 | # |

Fig. 3

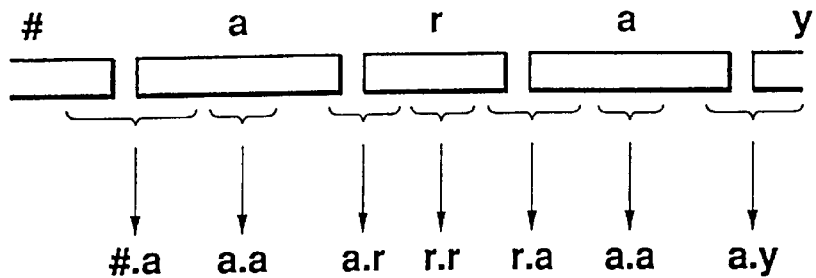
Fig. 4
LEARNING SAMPLE NUMBER (K = 2)
| SENTENCE NUMBERS FOR LEARNING | NON-BOUNDARY SAMPLES | BOUNDARY SAMPLES |
|---|---|---|
| 100 | 6468 | 6559 |
| 200 | 13370 | 13626 |
| 400 | 26755 | 27265 |
| 503 | 32123 | 32693 |
Fig. 5
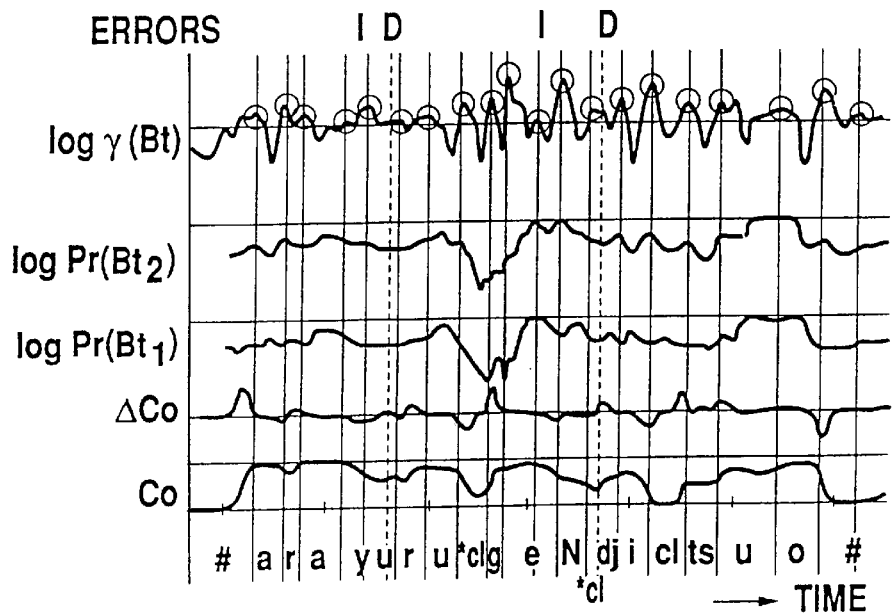
Fig. 6

Fig. 7

PHONEME BOUNDARY DETECTION RESULT (K=2, MIXTURE NUMBER IS VARIED)

| LEARNING SENTENCE | WINDOW WIDTH T | DIMENSION NUMBER N | MIXTURE NUMBER M | LEARNING DATA (EVALUATION: 3203 BOUNDARIES) | | | NON-LEARNING DATA (EVALUATION: 4001 BOUNDARIES) | | |
|---|---|---|---|---|---|---|---|---|---|
| | | | | DELETIONS | ADDITIONS | TOTAL | DELETIONS | ADDITIONS | TOTAL |
| 200 | 10 | 8 | 1 | 8.5 | 10.4 | 18.9 | 5.3 | 32.4 | 37.7 |
| | | | 2 | 10.9 | 12.6 | 23.5 | 8.8 | 27.8 | 36.6 |
| | | | 3 | 3.7 | 14.1 | 17.8 | 3.1 | 28.8 | 31.9 |
| | | | 4 | 3.7 | 14.7 | 18.4 | 2.7 | 33.2 | 35.9 |
| | | | 5 | 5.3 | 12.5 | 17.8 | 3.5 | 27.3 | 30.8 |
| | | | 6 | 5.3 | 11.9 | 17.2 | 3.0 | 27.7 | 30.7 |

PHONEME BOUNDARY DETECTION RESULT (K=2, WINDOW WIDTH IS VARIED)

| LEARNING SENTENCE | WINDOW WIDTH T | DIMENSION NUMBER N | MIXTURE NUMBER M | LEARNING DATA (EVALUATION: 3203 BOUNDARIES) | | | NON-LEARNING DATA (EVALUATION: 4001 BOUNDARIES) | | |
|---|---|---|---|---|---|---|---|---|---|
| | | | | DELETIONS | ADDITIONS | TOTAL | DELETIONS | ADDITIONS | TOTAL |
| 200 | 6 | 8 | 4 | 5.0 | 17.8 | 22.8 | 4.0 | 33.3 | 37.3 |
| | 8 | | | 6.1 | 11.0 | 17.1 | 4.9 | 25.1 | 30.0 |
| | 10 | | | 3.7 | 14.7 | 18.4 | 2.7 | 33.2 | 35.9 |
| | 12 | | | 6.2 | 13.8 | 20.0 | 4.6 | 30.7 | 35.3 |
| | 14 | | | 7.3 | 12.6 | 19.9 | 6.1 | 31.1 | 37.2 |
| | 16 | | | 8.6 | 13.3 | 21.9 | 7.4 | 33.7 | 41.1 |

Fig. 8

PHONEME BOUNDARY DETECTION RESULT (K=2, DIMENSION NUMBER IS VARIED)

| LEARNING SENTENCE | WINDOW WIDTH T | DIMENSION NUMBER N | MIXTURE NUMBER M | LEARNING DATA (EVALUATION: 3203 BOUNDARIES) | | | NON-LEARNING DATA (EVALUATION: 4001 BOUNDARIES) | | |
|---|---|---|---|---|---|---|---|---|---|
| | | | | DELETIONS | ADDITIONS | TOTAL | DELETIONS | ADDITIONS | TOTAL |
| 200 | 10 | 3 | 4 | 5.3 | 16.2 | 21.5 | 4.7 | 34.4 | 39.1 |
| | | 5 | | 4.9 | 16.4 | 21.3 | 3.9 | 35.4 | 39.3 |
| | | 8 | | 3.7 | 14.7 | 18.4 | 2.7 | 33.2 | 35.9 |
| | | 10 | | 6.2 | 10.8 | 17.0 | 4.6 | 26.5 | 31.1 |

Fig. 9

PHONEME BOUNDARY DETECTION RESULT (K=2, LEARNING DATA AMOUNT IS VARIED)

| LEARNING SENTENCE | WINDOW WIDTH T | DIMENSION NUMBER N | MIXTURE NUMBER M | LEARNING DATA (EVALUATION: 3203 BOUNDARIES) | | | NON-LEARNING DATA (EVALUATION: 4001 BOUNDARIES) | | |
|---|---|---|---|---|---|---|---|---|---|
| | | | | DELETIONS | INSERTIONS | TOTAL | DELETIONS | INSERTIONS | TOTAL |
| 100 | 10 | 8 | 4 | 4.9 | 11.0 | 15.9 | 4.0 | 20.5 | 24.5 |
| 200 | | | | 3.7 | 14.7 | 18.4 | 2.7 | 33.2 | 35.9 |
| 400 | | | | 6.8 | 9.0 | 15.8 | 5.0 | 16.1 | 21.1 |
| 503 | | | | 6.9 | 8.9 | 15.8 | 4.9 | 15.6 | 20.5 |

Fig. 10

| PHONEMES | CLASSIFICATION NUMBERS | |
|---|---|---|
| | NON-BOUNDARY SAMPLES | BOUNDARY SAMPLES |
| a | 1 | 2 |
| i | 3 | 4 |
| u | 5 | 6 |
| e | 7 | 8 |
| o | 9 | 10 |
| y,w,j | 11 | 12 |
| cl | 13 | 14 |
| p,t,k | 15 | 16 |
| ch,ts,s,sh,h,f | 17 | 18 |
| *cl | 19 | 20 |
| b,d,g,z,dj | 21 | 22 |
| m,n,N | 23 | 24 |
| r | 25 | 26 |
| # | 27 | 28 |

Fig. 12

LEARNING SAMPLE NUMBER (503 SENTENCES, K=28)

| PRECEDING PHONEMES | NON-BOUNDARY SAMPLES | BOUNDARY SAMPLES |
|---|---|---|
| a | 3561 | 3561 |
| i | 2355 | 2361 |
| u | 1958 | 1973 |
| e | 1867 | 1867 |
| o | 3038 | 3038 |
| y,w,j | 1519 | 1591 |
| cl | 2995 | 2995 |
| p,t,k | 2325 | 2830 |
| ch,ts,s,sh,h,f | 2417 | 2417 |
| *cl | 1930 | 1962 |
| b,d,g,z,dj | 1905 | 2289 |
| m,n,N | 3204 | 2863 |
| r | 1171 | 1229 |
| # | 2049 | 1546 |

Fig. 13

PHONEME BOUNDARY DETECTION RESULT (K=28, M=4)
LEARNING: 503 SENTENCES; WINDOW WIDTH (T): 10;
DIMENSION NUMBER(N); CORRECT ANSWER: WITHIN 3 FRAMES

| PRECEDING PHONEMES | LEARNING DATA (EVALUATION:3185 BOUNDARIES) | | | NON-LEARNING DATA (EVALUATION:3991 BOUNDARIES) | | |
|---|---|---|---|---|---|---|
| | DELETIONS | ADDITIONS | TOTAL | DELETIONS | ADDITIONS | TOTAL |
| a | 0.6 | 32.6 | 33.2 | 1.2 | 68.3 | 69.5 |
| i | 0.9 | 81.5 | 82.4 | 2.8 | 83.9 | 86.7 |
| u | 10.0 | 69.9 | 79.9 | 14.1 | 93.7 | 107.8 |
| e | 3.8 | 65.6 | 69.4 | 1.4 | 116.2 | 117.6 |
| o | 3.5 | 40.6 | 44.1 | 4.7 | 50.8 | 55.5 |
| y,w,j | 6.8 | 61.9 | 68.7 | 12.3 | 87.1 | 99.4 |
| cl | 1.1 | 53.3 | 54.4 | 1.6 | 102.2 | 103.8 |
| p,t,k | 0.8 | 40.2 | 41.0 | 0.5 | 39.4 | 39.9 |
| ch,ts,s,sh,h,f | 2.5 | 45.2 | 47.7 | 1.4 | 59.0 | 60.4 |
| *cl | 3.0 | 91.5 | 94.5 | 5.7 | 98.7 | 104.4 |
| b,d,g,z,dj | 2.1 | 88.3 | 90.4 | 3.2 | 114.4 | 117.6 |
| m,n,N | 8.3 | 53.8 | 62.1 | 6.5 | 85.1 | 91.6 |
| r | 1.7 | 20.5 | 22.2 | 6.1 | 21.2 | 27.3 |
| # | 2.0 | 96.6 | 98.6 | 11.4 | 72.5 | 83.9 |
| WEIGHTED MEAN | 3.3 | 58.6 | 61.9 | 4.7 | 76.5 | 81.2 |

Fig. 14

| STATES | PHONEMES |
|---|---|
| 1 | a |
| 2 | i |
| 3 | u |
| 4 | e |
| 5 | o |
| 6 | y |
| 7 | w |
| 8 | j |
| 9 | cl |
| 10 | P |
| 11 | t |
| 12 | k |
| 13 | ch |
| 14 | ts |
| 15 | s |
| 16 | sh |
| 17 | h |
| 18 | f |
| 19 | *cl |
| 20 | b |
| 21 | d |
| 22 | g |
| 23 | z |
| 24 | dj |
| 25 | m |
| 26 | n |
| 27 | r |
| 28 | N |
| 29 | # |

Fig. 17

| CATEGORY NO. OF PHONEME BOUNDARIES | KINDS OF PHONEME BOUNDARIES | |
|---|---|---|
| | PRECEDING PHONEMES | FOLLOWING PHONEMES |
| 1 | a | DIFFERENT PHONEME(S) FROM THE LEFT |
| 2 | i | " |
| 3 | u | " |
| 4 | e | " |
| 5 | o | " |
| 6 | y,w,j | " |
| 7 | cl | " |
| 8 | p,t,k | " |
| 9 | ch,ts,s,sh,h,f | " |
| 10 | *cl | " |
| 11 | b,d,g,z,dj | " |
| 12 | m,n,N | " |
| 13 | r | " |
| 14 | # | " |

IN CASE OF 1, SET $a_{ij} = 1$ OR $a_{ij} = 1/n_i$

FOLLOWING STATE j

| Preceding State i | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | Preceding Phoneme Name |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 0 | 1 | 0 | 0 | 0 | 0 | 0 | 1 | 1 | 1 | 1 | 1 | 1 | 1 | 1 | 1 | 1 | 1 | 1 | 1 | 1 | 1 | a |
| 2 | 1 | 1 | 1 | 1 | 1 | 1 | 1 | 0 | 1 | 0 | 0 | 0 | 0 | 0 | 1 | 1 | 1 | 1 | 1 | 1 | 1 | 1 | 1 | 1 | 1 | 1 | 1 | 1 | 1 | i |
| 3 | 1 | 1 | 1 | 1 | 1 | 1 | 1 | 0 | 1 | 0 | 0 | 0 | 0 | 0 | 1 | 1 | 1 | 0 | 1 | 1 | 1 | 1 | 1 | 1 | 1 | 1 | 1 | 1 | 1 | u |
| 4 | 1 | 1 | 1 | 1 | 1 | 1 | 1 | 0 | 1 | 0 | 0 | 0 | 0 | 0 | 1 | 1 | 1 | 0 | 1 | 1 | 1 | 1 | 1 | 1 | 1 | 1 | 1 | 1 | 1 | e |
| 5 | 1 | 1 | 1 | 1 | 1 | 1 | 1 | 0 | 1 | 0 | 0 | 0 | 0 | 0 | 1 | 1 | 1 | 1 | 1 | 1 | 1 | 1 | 1 | 1 | 1 | 1 | 1 | 1 | 1 | o |
| 6 | 1 | 0 | 1 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | y |
| 7 | 1 | 1 | 0 | 0 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | w |
| 8 | 1 | 0 | 1 | 1 | 1 | 0 | 0 | 1 | 1 | 0 | 0 | 0 | 0 | 0 | 0 | 0 | 0 | 0 | 0 | 0 | 0 | 0 | 0 | 0 | 1 | 0 | 0 | 0 | 0 | j |
| 9 | 0 | 0 | 0 | 0 | 1 | 0 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | cl |
| 10 | 1 | 1 | 1 | 1 | 1 | 0 | 0 | 1 | 1 | 0 | 0 | 0 | 1 | 0 | 0 | 0 | 1 | 0 | 0 | 0 | 0 | 0 | 0 | 0 | 0 | 0 | 0 | 0 | 0 | p |
| 11 | 1 | 1 | 0 | 1 | 1 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | t |
| 12 | 1 | 1 | 1 | 1 | 1 | 0 | 0 | 1 | 1 | 0 | 0 | 1 | 0 | 0 | 1 | 1 | 1 | 0 | 1 | 1 | 1 | 1 | 1 | 0 | 0 | 0 | 0 | 0 | 0 | k |
| 13 | 0 | 1 | 0 | 0 | 0 | 0 | 0 | 1 | 1 | 0 | 0 | 0 | 1 | 0 | 0 | 0 | 0 | 1 | 0 | 0 | 0 | 0 | 0 | 0 | 0 | 0 | 0 | 0 | 0 | ch |
| 14 | 0 | 0 | 1 | 0 | 0 | 1 | 0 | 0 | 1 | 0 | 0 | 0 | 0 | 1 | 1 | 1 | 0 | 0 | 1 | 0 | 0 | 0 | 0 | 0 | 0 | 0 | 0 | 0 | 0 | ts |
| 15 | 1 | 0 | 1 | 1 | 1 | 0 | 0 | 0 | 1 | 0 | 0 | 0 | 0 | 0 | 1 | 0 | 0 | 1 | 1 | 1 | 1 | 1 | 1 | 0 | 0 | 0 | 0 | 0 | 1 | s |
| 16 | 0 | 1 | 0 | 0 | 0 | 0 | 0 | 1 | 1 | 0 | 0 | 0 | 0 | 0 | 1 | 1 | 0 | 0 | 1 | 1 | 1 | 1 | 1 | 0 | 1 | 0 | 0 | 0 | 0 | sh |
| 17 | 1 | 1 | 1 | 1 | 1 | 0 | 0 | 1 | 1 | 0 | 0 | 0 | 0 | 0 | 1 | 1 | 1 | 0 | 1 | 0 | 0 | 0 | 0 | 0 | 0 | 0 | 0 | 0 | 0 | h |
| 18 | 1 | 1 | 0 | 1 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | f |
| 19 | 0 | 1 | 1 | 1 | 1 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | *cl |
| 20 | 1 | 1 | 1 | 1 | 1 | 0 | 0 | 1 | 0 | 0 | 0 | 0 | 0 | 0 | 0 | 0 | 0 | 1 | 0 | 0 | 0 | 0 | 0 | 0 | 0 | 0 | 0 | 0 | 0 | b |
| 21 | 1 | 1 | 0 | 1 | 1 | 0 | 0 | 1 | 0 | 0 | 0 | 0 | 0 | 0 | 0 | 0 | 0 | 0 | 0 | 0 | 1 | 0 | 0 | 0 | 0 | 0 | 0 | 0 | 0 | d |
| 22 | 1 | 1 | 1 | 1 | 1 | 0 | 0 | 1 | 0 | 0 | 0 | 0 | 0 | 0 | 0 | 0 | 0 | 0 | 0 | 0 | 0 | 1 | 0 | 0 | 0 | 0 | 0 | 0 | 0 | g |
| 23 | 1 | 0 | 1 | 1 | 1 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | z |
| 24 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 | dj |
| 25 | 1 | 1 | 1 | 1 | 1 | 0 | 0 | 1 | 0 | 0 | 0 | 0 | 0 | 0 | 0 | 0 | 0 | 0 | 0 | 0 | 0 | 0 | 0 | 0 | 1 | 0 | 0 | 0 | 0 | m |
| 26 | 1 | 1 | 1 | 1 | 1 | 0 | 0 | 1 | 0 | 0 | 0 | 0 | 0 | 0 | 0 | 0 | 0 | 0 | 0 | 0 | 0 | 0 | 0 | 0 | 0 | 1 | 0 | 0 | 0 | n |
| 27 | 1 | 1 | 1 | 1 | 1 | 0 | 0 | 1 | 0 | 0 | 0 | 0 | 0 | 1 | 0 | 0 | 0 | 0 | 0 | 0 | 0 | 0 | 0 | 0 | 0 | 0 | 1 | 0 | 1 | r |
| 28 | 1 | 1 | 1 | 1 | 1 | 1 | 1 | 0 | 1 | 0 | 0 | 0 | 0 | 0 | 1 | 1 | 0 | 1 | 1 | 1 | 1 | 1 | 1 | 1 | 1 | 1 | 1 | 1 | 1 | N |
| 29 | 1 | 1 | 1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 0 | 0 | 1 | # |
| | a | i | u | e | o | y | w | j | cl | p | t | k | ch | ts | s | sh | h | f | *cl | b | d | g | z | dj | m | n | r | N | # | |

FOLLOWING PHONEME NAME

Fig. 26

DESCRIPTION OF INPUT SPEECH

(0 # 23 a 33 r 34 a 46 y 52 u 55 r 58 u 68 *cl 71 g 74 e 85 N 91 *cl 95 dj 98 i 104 cl 111 ts 117 u 127 o 139 # 169 s 181 u 186 *cl 188 b 190 e 199 cl 203 t 205 e 213 *cl 216 dj 220 i 227 *cl 230 b 232 u 241 N 248 n 253 o 261 h 269 o 286 e 299 n 305 e 315 dj 321 i 326 m 331 a 340 *cl 343 g 345 e 351 cl 357 t 359 a 366 n 370 o 378 *cl 382 d 383 a 390 # 415)

TRACE RESULT (RECOGNITION RESULT) OF OPTIMUM STATE SERIES

(0 cl 22 t 26 a 32 r 35 a 46 i 61 u 68 *cl 71 g 74 e 85 N 90 *cl 95 dj 98 i 105 cl 109 ts 117 u 127 o 138 # 169 s 181 u 186 *cl 188 b 190 e 199 cl 203 t 206 e 213 *cl 216 dj 220 i 226 *cl 229 b 233 u 240 N 250 n 253 o 261 h 270 o 285 e 299 n 305 e 314 dj 321 i 326 m 331 a 339 *cl 343 g 345 e 351 cl 356 a 366 n 371 o 378 *cl 382 d 383 a 389 # 415)

FINAL SCORE (LOGARITHMIC LIKELIHOOD)

|  | TRANSITION PROBABILITIES $a_{ij}$ | ERROR RATES (%) | DETAILS (%) | | |
|---|---|---|---|---|---|
|  |  |  | SUBSTITUTIONS | INSERTIONS | DELETIONS |
| FIRST EMBODIMENT (INTERSTATE TRANSITION LIMIT) | 1 | 7.7 | 2.6 | 2.3 | 2.8 |
| BASIC HMM(VQ) | 1 | 39.3 | 3.5 | 35.3 | 0.5 |
| DURATION CONTROL (GAMMA DISTRIBUTION) | 1 | 11.1 | 3.2 | 6.7 | 1.2 |
| DURATION CONTROL (GAUSSIAN DISTRIBUTION) | 1 | 11.8 | 3.3 | 7.7 | 0.7 |
| FIRST EMBODIMENT (INTERSTATE TRANSITION LIMIT) | 1/ni | 8.4 | 3.0 | 1.2 | 4.2 |
| BASIC HMM | 1/ni | 17.9 | 4.2 | 12.5 | 1.2 |
| DURATION CONTROL (GAMMA DISTRIBUTION) | 1/ni | 8.9 | 2.5 | 4.0 | 2.5 |
| DURATION CONTROL (GAUSSIAN DISTRIBUTION) | 1/ni | 9.3 | 3.0 | 4.6 | 1.8 |

Fig. 28

| INTERSTATE TRANSITION POSSIBLE/SCORE GIVING TIMES | SCORES | TRANSITION PROBABILITIES $a_{ij}$ | ERROR RATES (%) | DETAILS (%) | | |
|---|---|---|---|---|---|---|
| | | | | SUBSTITUTIONS | INSERTIONS | DELETIONS |
| POSITIVE MAXIMAL POINT | 0.0 | 1 | 7.7 | 2.6 | 2.3 | 2.8 |
| POSITIVE MAXIMAL POINT | 1.0 | 1 | 7.9 | 2.5 | 2.8 | 2.6 |
| POSITIVE MAXIMAL POINT | 2.0 | 1 | 8.6 | 3.3 | 3.7 | 1.6 |
| POSITIVE MAXIMAL POINT | 3.0 | 1 | 9.1 | 3.3 | 4.2 | 1.6 |
| POSITIVE MAXIMAL POINT | 4.0 | 1 | 10.2 | 3.3 | 5.4 | 1.4 |
| POSITIVE MAXIMAL POINT | 5.0 | 1 | 10.5 | 3.3 | 5.8 | 1.4 |
| POSITIVE MAXIMAL POINT | 6.0 | 1 | 11.6 | 3.3 | 7.0 | 1.2 |
| POSITIVE MAXIMAL POINT | 7.0 | 1 | 12.1 | 3.5 | 7.5 | 1.1 |
| POSITIVE MAXIMAL POINT | 8.0 | 1 | 12.6 | 3.5 | 8.1 | 1.1 |
| POSITIVE MAXIMAL POINT | 0.0 | 1/ni | 8.4 | 3.0 | 1.2 | 4.2 |
| POSITIVE MAXIMAL POINT | 1.0 | 1/ni | 7.9 | 2.8 | 1.4 | 3.7 |
| POSITIVE MAXIMAL POINT | 2.0 | 1/ni | 7.7 | 3.2 | 1.4 | 3.2 |
| POSITIVE MAXIMAL POINT | 3.0 | 1/ni | 7.7 | 2.6 | 2.5 | 2.6 |
| POSITIVE MAXIMAL POINT | 4.0 | 1/ni | 7.5 | 2.8 | 2.8 | 1.9 |
| POSITIVE MAXIMAL POINT | 5.0 | 1/ni | 8.6 | 3.3 | 3.7 | 1.6 |
| POSITIVE MAXIMAL POINT | 6.0 | 1/ni | 9.1 | 3.3 | 4.2 | 1.6 |
| POSITIVE MAXIMAL POINT | 7.0 | 1/ni | 10.2 | 3.3 | 5.3 | 1.6 |
| POSITIVE MAXIMAL POINT | 8.0 | 1/ni | 10.5 | 3.3 | 5.8 | 1.4 |

Fig. 30

| INTERSTATE TRANSITION POSSIBLE/SCORE GIVING TIMES | SCORES | TRANSITION PROBABILITIES $a_{ij}$ | ERROR RATES (%) | DETAILS (%) | | |
|---|---|---|---|---|---|---|
| | | | | SUBSTITUTIONS | INSERTIONS | DELETIONS |
| POSITIVE AREA | 0.0 | 1 | 7.9 | 2.8 | 2.6 | 2.5 |
| POSITIVE AREA | 1.0 | 1 | 9.1 | 2.8 | 4.4 | 1.9 |
| POSITIVE AREA | 2.0 | 1 | 10.4 | 2.8 | 5.8 | 1.8 |
| POSITIVE AREA | 3.0 | 1 | 12.1 | 2.8 | 7.7 | 1.6 |
| POSITIVE AREA | 4.0 | 1 | 13.0 | 2.8 | 8.6 | 1.6 |
| POSITIVE AREA | 5.0 | 1 | 14.6 | 2.8 | 10.2 | 1.6 |
| POSITIVE AREA | 6.0 | 1 | 16.7 | 3.2 | 12.1 | 1.4 |
| POSITIVE AREA | 7.0 | 1 | 17.4 | 3.0 | 13.0 | 1.4 |
| POSITIVE AREA | 8.0 | 1 | 18.6 | 3.0 | 14.2 | 1.4 |
| POSITIVE AREA | 0.0 | 1/ni | 8.1 | 2.5 | 1.9 | 3.7 |
| POSITIVE AREA | 1.0 | 1/ni | 7.5 | 2.8 | 2.3 | 2.5 |
| POSITIVE AREA | 2.0 | 1/ni | 7.5 | 2.8 | 2.3 | 2.5 |
| POSITIVE AREA | 3.0 | 1/ni | 7.4 | 2.8 | 2.6 | 1.9 |
| POSITIVE AREA | 4.0 | 1/ni | 8.9 | 2.8 | 4.2 | 1.9 |
| POSITIVE AREA | 5.0 | 1/ni | 10.7 | 2.8 | 6.1 | 1.8 |
| POSITIVE AREA | 6.0 | 1/ni | 12.1 | 2.8 | 7.7 | 1.6 |
| POSITIVE AREA | 7.0 | 1/ni | 13.0 | 2.8 | 8.6 | 1.6 |
| POSITIVE AREA | 8.0 | 1/ni | 15.1 | 2.8 | 10.7 | 1.6 |

Fig. 31

| INTERSTATE TRANSITION POSSIBLE TIMES | SCORE GIVING TIMES | SCORES | TRANSITION PROBABILITIES $a_{ij}$ | ERROR RATES (%) | DETAILS (%) | | |
|---|---|---|---|---|---|---|---|
| | | | | | SUBSTITUTIONS | INSERTIONS | DELETIONS |
| WHOLE SECTION | POSITIVE AREA | 0.0 | 1 | 39.3 | 3.5 | 35.3 | 0.5 |
| WHOLE SECTION | POSITIVE AREA | 1.0 | 1 | 44.7 | 2.6 | 41.6 | 0.5 |
| WHOLE SECTION | POSITIVE AREA | 2.0 | 1 | 49.3 | 2.5 | 46.7 | 0.2 |
| WHOLE SECTION | POSITIVE AREA | 3.0 | 1 | 57.0 | 2.1 | 54.7 | 0.2 |
| WHOLE SECTION | POSITIVE AREA | 4.0 | 1 | 64.9 | 1.9 | 62.8 | 0.2 |
| WHOLE SECTION | POSITIVE AREA | 5.0 | 1 | 75.4 | 1.6 | 73.7 | 0.2 |
| WHOLE SECTION | POSITIVE AREA | 6.0 | 1 | 87.9 | 1.4 | 86.5 | 0.0 |
| WHOLE SECTION | POSITIVE AREA | 7.0 | 1 | 100.2 | 1.4 | 98.8 | 0.0 |
| WHOLE SECTION | POSITIVE AREA | 8.0 | 1 | 114.9 | 1.4 | 113.5 | 0.0 |
| WHOLE SECTION | POSITIVE AREA | 0.0 | 1/ni | 17.9 | 4.2 | 12.5 | 1.2 |
| WHOLE SECTION | POSITIVE AREA | 1.0 | 1/ni | 17.4 | 3.9 | 12.6 | 0.9 |
| WHOLE SECTION | POSITIVE AREA | 2.0 | 1/ni | 16.8 | 3.7 | 12.5 | 0.7 |
| WHOLE SECTION | POSITIVE AREA | 3.0 | 1/ni | 17.0 | 2.3 | 14.0 | 0.7 |
| WHOLE SECTION | POSITIVE AREA | 4.0 | 1/ni | 19.1 | 1.6 | 16.8 | 0.7 |
| WHOLE SECTION | POSITIVE AREA | 5.0 | 1/ni | 20.5 | 1.6 | 18.4 | 0.5 |
| WHOLE SECTION | POSITIVE AREA | 6.0 | 1/ni | 23.2 | 1.4 | 21.4 | 0.4 |
| WHOLE SECTION | POSITIVE AREA | 7.0 | 1/ni | 30.0 | 1.2 | 28.4 | 0.4 |
| WHOLE SECTION | POSITIVE AREA | 8.0 | 1/ni | 38.8 | 1.6 | 36.8 | 0.4 |

Fig. 33

| INTERSTATE TRANSITION POSSIBLE TIMES | SCORE GIVING TIMES | SCORES | TRANSITION PROBABILITIES $a_{ij}$ | ERROR RATES (%) | DETAILS (%) | | |
|---|---|---|---|---|---|---|---|
| | | | | | SUBSTITUTIONS | INSERTIONS | DELETIONS |
| WHOLE SECTION | POSITIVE MAXIMAL POINT | 0.0 | 1 | 39.3 | 3.5 | 35.3 | 0.5 |
| WHOLE SECTION | POSITIVE MAXIMAL POINT | 1.0 | 1 | 41.1 | 2.6 | 37.9 | 0.5 |
| WHOLE SECTION | POSITIVE MAXIMAL POINT | 2.0 | 1 | 44.6 | 2.5 | 41.6 | 0.5 |
| WHOLE SECTION | POSITIVE MAXIMAL POINT | 3.0 | 1 | 48.8 | 2.1 | 46.5 | 0.2 |
| WHOLE SECTION | POSITIVE MAXIMAL POINT | 4.0 | 1 | 53.2 | 1.6 | 51.4 | 0.2 |
| WHOLE SECTION | POSITIVE MAXIMAL POINT | 5.0 | 1 | 56.8 | 1.6 | 55.1 | 0.2 |
| WHOLE SECTION | POSITIVE MAXIMAL POINT | 6.0 | 1 | 59.8 | 1.1 | 58.6 | 0.2 |
| WHOLE SECTION | POSITIVE MAXIMAL POINT | 7.0 | 1 | 62.3 | 0.9 | 61.2 | 0.2 |
| WHOLE SECTION | POSITIVE MAXIMAL POINT | 8.0 | 1 | 68.4 | 0.9 | 67.4 | 0.2 |
| WHOLE SECTION | POSITIVE MAXIMAL POINT | 0.0 | 1/ni | 17.9 | 4.2 | 12.5 | 1.2 |
| WHOLE SECTION | POSITIVE MAXIMAL POINT | 1.0 | 1/ni | 17.0 | 4.0 | 12.1 | 0.9 |
| WHOLE SECTION | POSITIVE MAXIMAL POINT | 2.0 | 1/ni | 16.1 | 3.7 | 11.8 | 0.7 |
| WHOLE SECTION | POSITIVE MAXIMAL POINT | 3.0 | 1/ni | 16.3 | 3.7 | 11.9 | 0.7 |
| WHOLE SECTION | POSITIVE MAXIMAL POINT | 4.0 | 1/ni | 16.5 | 2.6 | 13.2 | 0.7 |
| WHOLE SECTION | POSITIVE MAXIMAL POINT | 5.0 | 1/ni | 17.0 | 2.5 | 13.9 | 0.7 |
| WHOLE SECTION | POSITIVE MAXIMAL POINT | 6.0 | 1/ni | 17.9 | 1.8 | 15.6 | 0.5 |
| WHOLE SECTION | POSITIVE MAXIMAL POINT | 7.0 | 1/ni | 21.2 | 1.4 | 19.3 | 0.5 |
| WHOLE SECTION | POSITIVE MAXIMAL POINT | 8.0 | 1/ni | 25.8 | 1.4 | 23.9 | 0.5 |

| INTERSTATE TRANSITION POSSIBLE TIMES | SCORE GIVING TIMES | ε | TRANSITION PROBABILITIES $a_{ij}$ | ERROR RATES (%) | DETAILS (%) | | |
|---|---|---|---|---|---|---|---|
| | | | | | SUBSTITUTIONS | INSERTIONS | DELETIONS |
| POSITIVE MAXIMAL POINT | POSITIVE MAXIMAL POINT | 0.005 | 1 | 7.7 | 2.6 | 2.5 | 2.6 |
| POSITIVE MAXIMAL POINT | POSITIVE MAXIMAL POINT | 0.01 | 1 | 7.7 | 2.6 | 2.5 | 2.6 |
| POSITIVE MAXIMAL POINT | POSITIVE MAXIMAL POINT | 0.05 | 1 | 8.1 | 2.5 | 3.0 | 2.6 |
| POSITIVE MAXIMAL POINT | POSITIVE MAXIMAL POINT | 0.1 | 1 | 8.1 | 3.0 | 3.3 | 1.8 |
| POSITIVE MAXIMAL POINT | POSITIVE MAXIMAL POINT | 0.005 | 1/ni | 8.4 | 3.0 | 1.2 | 4.2 |
| POSITIVE MAXIMAL POINT | POSITIVE MAXIMAL POINT | 0.01 | 1/ni | 8.4 | 3.0 | 1.2 | 4.2 |
| POSITIVE MAXIMAL POINT | POSITIVE MAXIMAL POINT | 0.05 | 1/ni | 7.9 | 2.8 | 1.4 | 3.7 |
| POSITIVE MAXIMAL POINT | POSITIVE MAXIMAL POINT | 0.1 | 1/ni | 7.5 | 2.6 | 1.6 | 3.3 |
| POSITIVE MAXIMAL POINT | POSITIVE MAXIMAL POINT | 0.2 | 1/ni | 8.2 | 3.3 | 2.6 | 2.3 |
| POSITIVE MAXIMAL POINT | POSITIVE MAXIMAL POINT | 0.5 | 1/ni | 9.6 | 3.3 | 4.9 | 1.4 |
| POSITIVE AREA | POSITIVE AREA | 0.005 | 1 | 7.9 | 2.8 | 2.8 | 2.3 |
| POSITIVE AREA | POSITIVE AREA | 0.01 | 1 | 7.5 | 2.8 | 2.8 | 1.9 |
| POSITIVE AREA | POSITIVE AREA | 0.05 | 1 | 7.7 | 2.8 | 3.0 | 1.9 |
| POSITIVE AREA | POSITIVE AREA | 0.1 | 1 | 8.4 | 2.8 | 3.7 | 1.9 |
| POSITIVE AREA | POSITIVE AREA | 0.005 | 1/ni | 8.1 | 2.5 | 1.9 | 3.7 |
| POSITIVE AREA | POSITIVE AREA | 0.01 | 1/ni | 8.1 | 2.5 | 1.9 | 3.7 |
| POSITIVE AREA | POSITIVE AREA | 0.05 | 1/ni | 7.9 | 2.8 | 2.1 | 3.0 |
| POSITIVE AREA | POSITIVE AREA | 0.1 | 1/ni | 7.2 | 2.8 | 2.1 | 2.3 |
| POSITIVE AREA | POSITIVE AREA | 0.2 | 1/ni | 7.9 | 3.0 | 3.0 | 1.9 |
| POSITIVE AREA | POSITIVE AREA | 0.5 | 1/ni | 10.4 | 3.2 | 5.8 | 1.4 |

Fig. 35

BOUNDARY ESTIMATION METHOD OF SPEECH RECOGNITION AND SPEECH RECOGNITION APPARATUS

This application is a continuation of application Ser. No. 08/129,946, filed Sep. 30, 1993.

BACKGROUND OF THE INVENTION i) Field of the Invention

The present invention relates to an estimation method of boundaries in speech for use in improving performance of a speech recognition apparatus and a speech recognition apparatus for recognizing continuous speech and converting it to a phonetic series.

ii) Description of the Related Arts

Conventionally, as a method for performing speech recognition of a large vocabulary, two methods are known. In one method, after an input speech is segmented into phonemes, the likelihood is calculated for every phoneme and the likelihood of a whole speech concerning a connection of possible phonemes is calculated so as to recognize the input speech. In another method, the segmentation of the input speech is not carried out and the likelihood of a connected model of the possible phonemes and the whole speech is calculated so as to recognize the input speech.

In general, in the former method, an error of the segmentation becomes fatal and thus a recognition precision drops. However, the calculation amount is reduced. In the latter method, eventually, the possibility of almost all of the segmentation is checked and hence the calculation amount becomes enormous. However, the recognition accuracy is considered to be high.

In these methods, it is sometimes necessary to estimate boundaries of voices within speech in a definite but not so completely definite manner with some ambiguity. Many methods for estimating the boundaries of speech such as phonemes, syllables and words in the speech and segmenting the speech have already been disclosed in documents as follows:

a) "A Neural Network for Phonetic Segmentation of Continuous Speech", Acoustical Society of Japan Proceedings, 2-P-6, October 1988.

b) "Phoneme Segmentation Expert System Using Spectrogram Reading Knowledge", Electronic Information Communications Association of Japan Transactions D-II Vol. J73-D-II, No. 1, pp. 1–9, January 1990.

c) "Segmentation of Continuous Speech by HMM (Hidden Markov Model) and Bayesian Probability", Electronic Information Communications Association of Japan Transactions D-II Vol. J72-D-II, No. 1, pp. 1–10, January 1989.

d) "Phonemic Units Segmentation in Various Phonetic Environments", Electronic Information Communications Association of Japan Transactions D-II Vol. J72-D-II, No. 8, pp. 1221–1227, August 1989.

e) "A Phoneme Segmentation Parameter Based on Onset-Sensitive Auditory Neuron Model", Electronic Information Communications Association of Japan Transactions A Vol. J71-A, No. 3, pp. 592–600, March 1988.

f) "A Segmentation Algorithm for Connected Word Recognition Based on Estimation Principles", IEEE Transactions on Acoustics, Speech, and Signal Processing, Vol. ASSP-31, No. 4, August 1983.

FIG. 36 illustrates a conventional estimation method of boundaries within speech, constructed according to the method based on the neural network, as disclosed in the aforementioned document a).

In FIG. 36, a speech analyzer 10 calculates a power spectrum of an input speech every frame period of 5 ms by a frequency analysis of a frame length of 20 ms. A segmentation parameter calculator 12 calculates 5 segmentation parameters from each power spectrum output from the speech analyzer 10. A time window 2 adds the segmentation parameters together in a range of a time width T (in terms of time of 30 ms to 150 ms) to an input layer of a neural network 1001. The neural network 1001 is comprised of three layers such as the input layer, an intermediate layer and an output layer, which are composed of T×5, 50 and 1 element numbers, respectively.

When a mode selector 3 selects a "Learning", a teacher signal part 1003 generates a signal "1" at the boundaries and a signal "0" at positions other than the boundaries. A weighting factor corrector 1002 successively corrects weighting factors of links extended between the layers on the basis of a back propagation method so as to reduce an error between a teacher signal generated from the teacher signal part 1003 and an output signal obtained in the output layer of the neural network 1001.

On the other hand, when the mode selector 3 selects an "Estimation", the output signal of the neural network 1001 is a likelihood time series as the degree of the presence of voice boundaries in the speech.

In the above-described conventional methods, in principle, the complicated segmentation parameters determined depending on the various phoneme environment on the basis of conventional experience and the procedure for the segmentation are automatically produced in the neural network, and hence the exceptional processings based on the conventional experience and the formation of the complicated discrimination rule are executed in the neural network instead.

Further, as a speech recognition apparatus, one is known as follows.

FIG. 37 shows a conventional speech recognition apparatus of this kind using the HMM (hidden Markov model) as a phonetic model series. In FIG. 37, a speech section detector 11 detects a speech section of an input speech and outputs a speech signal R1. A feature extractor 1 receives the speech signal R1 from the speech section detector 11 and extracts a feature parameter every short period of time from the speech signal R1 to output a time series R2 of the feature parameters. (The time series R2 of the feature parameters are hereinafter referred to as $x_1, x_2, \ldots, X_T$. In this case, $x_t$ represents the feature parameter at the time t and T represents the length of the speech section.)

An HMM parameter storage 14 stores a parameter R14 of the HMM as the phonetic series model. The HMM includes states of n in number and the HMM parameter R14 includes a transition probability $a_{ij}$ from the state i to the state j, a mean vector $\mu_{mj}$ as a parameter representing the m-th element Gaussian distribution of a mixed distribution used for calculation of an output probability of the state j, a covariance matrix $\Sigma_{mj}$ and a branch probability $\lambda_{mj}$.

An HMM arithmetic means 13 as a model arithmetic means executes an HMM calculation on reference to the HMM parameter R14 by applying the HMM as the phonetic model series to the feature parameter time series $x_1, X_2, \ldots, X_T$ and outputs an HMM arithmetic result R13. The HMM arithmetic can be calculated under the following initial conditions according to recurrence formulas (1) and (2) based on a Viterbi algorithm in which the sum of the probability is replaced by the maximizing calculation of the probability.

$$\alpha(j, t) = \max_{1 \leq i \leq n} \{\alpha(i, t-1)a_{ij}b_j(x_t)\} \quad (t = 1, 2, ..., T) \quad (1)$$

$$\beta(j, t) = \operatorname*{argmax}_{1 \leq i \leq n}\{\alpha(i, t-1)a_{ij}b_j(x_t)\} \quad (t = 1, 2, ..., T) \quad (2)$$

$$\alpha(i, 0) = 1 \quad (i = 1, 2, ..., n)$$

wherein $\alpha(j,t)$ represents a probability (forward probability) staying in the state j at the time t and $\beta(j,t)$ is a back pointer for representing the optimum state number of just one number before reaching the state j at the time t. Also, $b_{j(xt)}$ can be obtained as a mixed distribution of an element Gaussian distribution of M number at the output probability of the state j by using a probability density function N of a Gaussian distribution according to the following formula (3).

$$b_j(x_t) = \sum_{m=1}^{M} \lambda_{mj} N(x_t | \mu_{mj}, \Sigma_{mj}) \quad (3)$$

An optimum state series detector 15 calculates an optimum state series R15 {hereinafter referred to as β hat (1), β hat (2), . . . , β hat (T)} (β hat=β) from the variables $\alpha(j,t)$ and $\beta(j,t)$ obtained as the HMM arithmetic result R13 and outputs the calculated optimum state series R15. The optimum state series detector 15 can be calculated under the following initial conditions according to recurrence formula (4). In the aforementioned basic HMM wherein formula (1) is the recurrence formula, by ignoring the output probability, a probability staying in the state j for a continuation time or duration τ by repeating the transition within the state j ρ times is given by formula (5).

$$\beta(t-1) = \beta(\beta(t), t) \quad (t = T, T-1, ..., 1) \quad (4)$$

$$\beta(T) = \operatorname*{argmax}_{1 \leq j \leq n} \alpha(j, T)$$

$$d_j(\tau) = a_{jj}^\tau \quad (5)$$

In this case, when $a_{jj}<1$, formula (5) becomes a function which exponentially reduces as the duration τ increases, and hence a problem arises, that is, formula (5) is inappropriate as the approximation of the distribution of the actual state duration. In order to solve this defect of the above-described HMM, the state duration is expressed as a probability distribution close to the actual distribution and based on this probability expression, some HMMs restricting the state duration to a positive value have been proposed. Accordingly, another conventional system using this duration control type of HMM as the phonetic series model will be described.

FIG. 38 illustrates a conventional speech recognition apparatus using a duration control type of HMM, as disclosed in "Development of an Acoustic-Phonetic Hidden Markov Model for Continuous Speech Recognition", by Ljolje et al., IEEE Transactions on Signal Processing, Vol. 39, No. 1, pp. 29–39, January 1991. FIG. 39 illustrates a state transition structure of the HMM. The HMM includes states of n number (n=43) and each state corresponds to one phoneme of the English language. The state i and the state j are connected by the transition probability $a_{ij}$, and the transition probability $a_{ij}$ within the same state is adapted to be 0. The output probability in each state is expressed by $b_j(x_t)$. On the other hand, in a duration control parameter storage 6, parameters $v_j$ and $\eta_j$ of a gamma distribution approximating the distribution of the duration about each state j (j=1, 2, . . . , n) as a duration control parameter R6 are stored. The HMM calculation in the HMM arithmetic means 13 is executed under the following initial conditions according to recurrence formulas (6) and (7) based on the Viterbi algorithm.

$$\alpha(j, t) = \max_{1 \leq i \leq n}\left[\max_{\tau \leq t}\left\{\alpha(i, t-\tau)a_{ij}d_j(\tau)\prod_{\theta=1}^{\tau}b_j(x_{t-\tau+\theta})\right\}\right] \quad (6)$$

$$\beta(j, t) = \operatorname*{argmax}_{1 \leq i \leq n}\left[\max_{\tau \leq t}\left\{\alpha(i, t-\tau)a_{ij}d_j(\tau)\prod_{\theta=1}^{\tau}b_j(x_{t-\tau+\theta})\right\}\right] \quad (7)$$

$$\alpha(i, 0) = 1 \quad (i = 1, 2, ..., n)$$

$$d_j(\tau) = \frac{\eta_j^{v_j} \tau^{v_j-1}}{\Gamma(v_j)}\exp(-\eta_j \tau) \quad (8)$$

In this case, $d_j(\tau)$ can be given by a gamma distribution of formula (8) including two parameters $v_j$ and $\eta_j$ regarding the state j at a probability which the duration of the state is τ. Also, $\Gamma(v_j)$ is a gamma function. Further, the average of the duration of the state j becomes $v_j/\eta_j$ and the variance of the same becomes $v_j/\eta_j^2$.

In this conventional apparatus, the recognition performance can be improved in comparison with the basic HMM of formula (1) for controlling the duration of staying in each state by applying the approximation distribution to the actual distribution.

However, in the aforementioned conventional estimation method of the boundaries within the speech, since the error between the output signal of the neural network and the teacher signal is minimized, the output likelihood time series is not directly concerned with the probability, and, when it is used for the speech recognition based on the probability model, it is required to temporarily convert the estimated likelihood to the probability value. Also, the unit number of the intermediate layer and the layer number of the intermediate layer in the neural network can be given at will. When the layer number and the unit number of the intermediate layer are enlarged, it is easy to obtain the effective performance. However, for example, the convergence of the learning happens later and it is liable to fall into a local valley. Hence, it is not easy to implement the learning.

Further, in the conventional speech recognition apparatus, the duration control type of HMM is used as the phonetic model series in this method, and as represented in recurrence formulas (6) and (7), the maximizing calculation concerning the variable τ is included within the maximizing calculation relating to the variable i represented by max in the recurrence formula. In addition, the calculation on the secondary internal side of the recurrence formula is more complicated in comparison with formula (1) and hence the calculation amount considerably increases compared with the basic HMM calculation represented in formula (1). Furthermore, in the case of the duration distribution obtained from a learning sample of a particular vocalization, the duration distribution becomes irrelevant to the speech at the different speech speed from the learning speech.

SUMMARY OF THE INVENTION

Accordingly, it is an object of the present invention to provide a boundary estimation method in order to solve the aforementioned problems of the prior art, which is capable of directly obtaining an estimation amount corresponding to a probability and readily carrying out learning.

It is another object of the present invention to provide a speech recognition apparatus which is capable of simplifying a calculation in an HMM arithmetic means as a model arithmetic means and which has high recognition accuracy.

In order to achieve the objects of the present invention, a boundary estimation method according to the present invention comprises the steps of:

(a) extracting as samples, values exhibited in a window of set time width by a parameter group extended in time series obtained by analyzing an input speech;

(b) calculating a first probability density of existence of a boundary of the input speech at a center of the window;

(c) calculating a second probability density of nonexistence of the boundary of the input speech at the center of the window; and (d) calculating a degree of existence of the boundary of the speech at the center of the window on the basis of a calculation including the first probability density and the second probability density.

Further, in order to achieve the objects of the present invention, a speech recognition apparatus according to the present invention, comprises:

feature extracting means for analyzing an input speech to convert to feature parameters of time series;

boundary detecting means for detecting either phonetic boundaries in the input speech from the feature parameters of the time series or areas near the phonetic boundaries;

model arithmetic means for restricting a time when the boundaries of a plurality of phonetic model series are formed to either the phonetic boundaries detected by the boundary detecting means or the areas near the phonetic boundaries when the phonetic model series corresponding to the feature parameters are prepared; and phonetic series transform means for selecting suitable phonetic model series corresponding to the input speech from the result of the model arithmetic means.

The boundary detecting means detects the phonetic boundaries or areas near the phonetic boundaries by using the boundary estimation method.

Moreover, in order to achieve the objects of the present invention, a speech recognition apparatus according to the present invention, comprises:

feature extracting means for analyzing an input speech to convert to feature parameters of time series;

boundary detecting means for detecting either phonetic boundaries in the input speech from the feature parameters of the time series or areas near the phonetic boundaries;

model arithmetic means for promoting an occurrence of a transition of the phonetic model series in either the phonetic boundaries detected by the boundary detecting means or the areas near the phonetic boundaries when preparing the phonetic model series corresponding to the feature parameters; and phonetic series transform means for selecting suitable phonetic model series corresponding to the input speech from the result of the model arithmetic means.

The boundary detecting means detects the phonetic boundaries or areas near the phonetic boundaries by using the boundary estimation method.

BRIEF DESCRIPTION OF THE DRAWINGS

The objects, features and advantages of the present invention will become more apparent from the consideration of the following detailed description, taken in conjunction with the accompanying drawings, in which:

FIG. 3 is a schematic diagram exemplifying a description of phonemes of speech data used in the first embodiment of the present invention;

FIG. 4 is a schematic view explaining a sample cutout method for use in the first embodiment of the present invention;

FIG. 5 is a schematic diagram showing learning sample numbers for evaluation of the first embodiment of the present invention;

FIG. 6 is a schematic view showing one embodiment of an operation of the first embodiment of the present invention;

FIG. 7 is a schematic diagram showing an embodiment result of the first embodiment of the present invention;

FIG. 8 is a schematic diagram showing an experiment result of the first embodiment of the present invention;

FIG. 9 is a schematic diagram showing another experiment result of the first embodiment of the present invention;

FIG. 10 is a schematic diagram shown a further experiment result of the first embodiment of the present invention;

FIG. 12 is a schematic diagram showing contents of a table used in the second embodiment of the present invention;

FIG. 13 is a schematic diagram showing learning sample numbers for evaluation of the second embodiment of the present invention;

FIG. 14 is a schematic diagram shown an experiment result of the second embodiment of the present invention;

FIG. 17 is a schematic diagram showing the relationship between the states of the HMM and phonemes in the third embodiment of the present invention;

FIG. 20 is a schematic diagram showing the relationship between kinds and category numbers of phoneme boundaries in the third embodiment of the present invention;

FIG. 23 is a schematic diagram showing relationship between state transition and phoneme boundary category in the third embodiment of the present invention;

FIG. 26 is a schematic diagram showing a possible state transition in the third embodiment of the present invention;

FIG. 27 is a schematic diagram showing a recognition result in the third embodiment of the present invention;

FIG. 28 is a schematic diagram showing a performance evaluation result in the third embodiment of the present invention;

FIG. 30 is a schematic diagram showing a performance evaluation result in the fourth embodiment of the present invention;

FIG. 31 is a schematic diagram showing a performance evaluation result in the fifth embodiment of the present invention;

FIG. 33 is a schematic diagram showing a performance evaluation result in the sixth embodiment of the present invention;

FIG. 35 is a schematic diagram showing a performance evaluation result in the seventh embodiment of the present invention;

DESCRIPTION OF THE PREFERRED EMBODIMENTS

Figure 1:
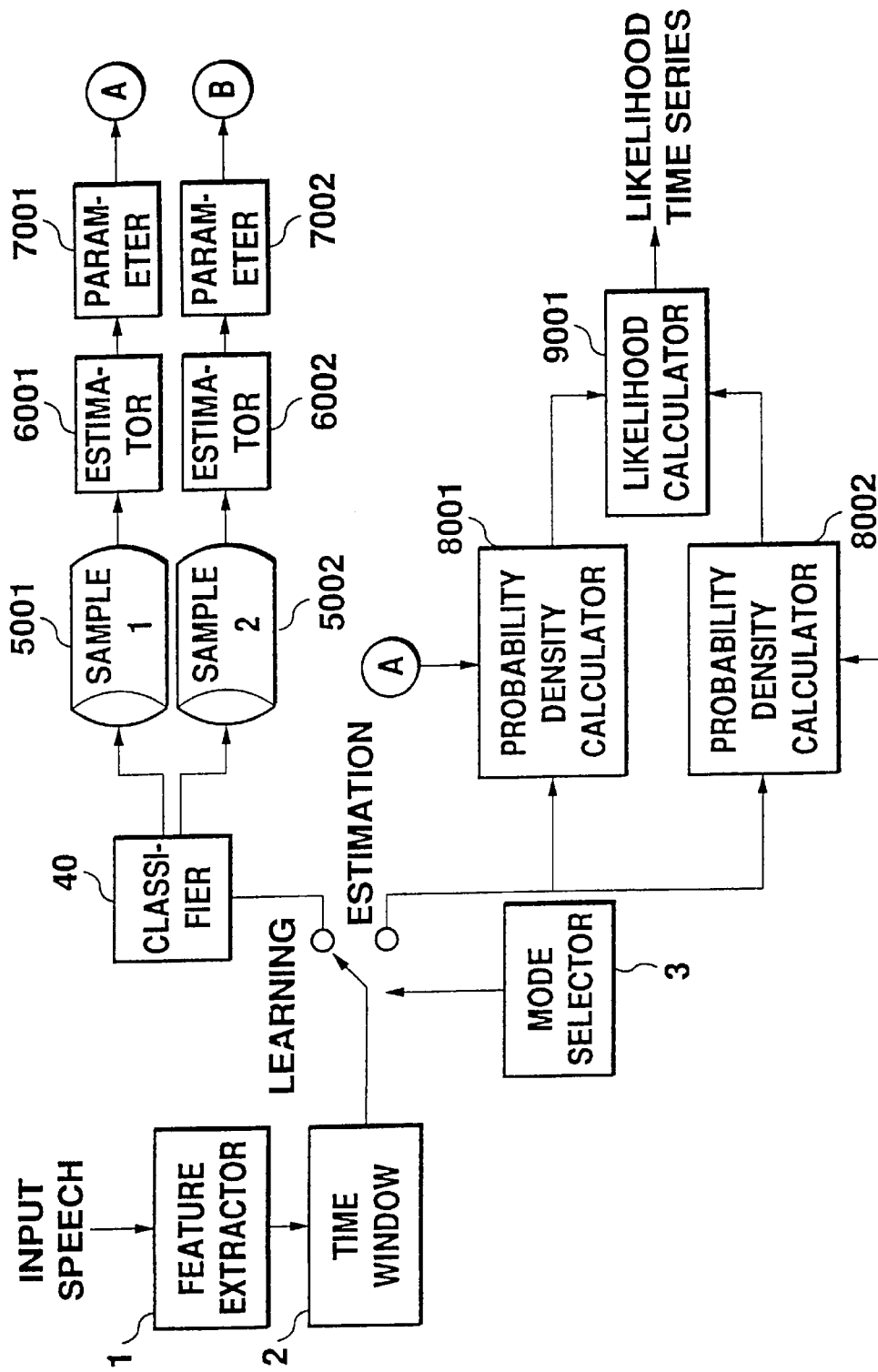
FIG. 1 is a block diagram showing a first embodiment according to the present invention, that is, a first embodiment of an estimation method of boundaries in speech.

The present invention will now be described in connection with its preferred embodiments with reference to the accompanying drawings, wherein like reference characters designate like or corresponding parts throughout the views and thus the repeated description thereof can be omitted for brevity.

The first embodiment of the present invention will now be described.

In this embodiment, when a parameter within a window of a predetermined time width in a time series of parameters obtained by analyzing an input speech is extracted as one sample and an existence degree of a boundary within the speech in the center of the window is calculated, the following processing will be carried out.

That is, in a learning mode, samples in the speech are classified into at least a boundary group and a non-boundary group and a model of a probability distribution is applied to each of the classified samples to estimate parameters of the model of the distribution. On the other hand, in an estimation mode, based on the estimated parameter of the model of each distribution in the learning mode, the first probability density of the existence of the boundary at the center of the window and the second probability density of the non-existence of the boundary at the center of the window are calculated, and based on a probability density including the first probability density and a probability density including the second probability density, the existence degree of the boundary in the speech at the center of the window is calculated.

FIG. 1 illustrates the first embodiment of the present invention, that is, a system for performing the first embodiment of a boundary estimation method.

A feature extractor 1 obtains an n number of melcepstrum coefficients every 10 ms frame period from an input speech by a linear prediction melcepstrum analysis of a frame length of 25.6 ms. A time window 2 puts together TN number of melcepstrum coefficients in a range of a time width T to get one sample. Each sample is expressed by vectors of TN dimensions as follows.

Assuming that a sample at a time t is $B_t$ and a vector composed of melcepstrum coefficients at the time t of the output of the feature extractor 1 is $x_t$, by connecting the vectors of the melcepstrum coefficients so that the time t may be the center of the time window, the sample $B_t$ is given according to formula (9) (wherein T is an even number).

$$B_t = (X^T_{t-T/2}, X^T_{t-T/2+1}, \ldots, X^T_{t-1}, X^T_t, X^T_{t+1}, \ldots, X^T_{t+T/2-1})^T \quad (9)$$

wherein the symbol $x^T$ represents an inversion of a vertical vector X.

A mode selector 3 selects either of the "learning" mode or "estimation" mode. First, the operation when the mode selector 3 sets the learning mode will now be described. A classifier 40 classifies the samples output from the time window 2 into first and second groups and sends the first group of samples having a steady part as a non-boundary in the speech at their center to a first sample storage 5001 and also the second group of samples having a boundary in the speech at their center to a second sample storage 5002.

After the classification of all learning data is finished, a first estimator 6001 applies one of the probability distributions, that is, a mixed multidimensional normal distribution to the first group of samples stored in the first sample storage 5001 to estimate parameters of the distribution, and the estimated parameters are stored in a first parameter part 7001. The first estimator 6001 calculates a probability distribution for the samples within Bt, according to the formula (10), in order to generate the parameters for this distribution.

$$Pr(B_t) = \sum_{m=1}^{M} \lambda^{(m)} N(B_t, \mu^{(m)}, \Sigma^{(m)}) \quad (10)$$

In formula (10), $\lambda^{(m)}$, $\mu^{(m)}$ and $\Sigma^{(m)}$ are stored as the parameters of this distribution. Also, M represents a number of multidimensional normal distributions of elements constituting the mixed multidimensional normal distribution, N represents a probability density function representing a multidimensional normal distribution, and $\lambda^{(m)}$, $\mu^{(m)}$ and $\Sigma^{(m)}$ represent a branch probability, an average vector and a covariance matrix, respectively, against the multidimensional normal distribution of the m-th element.

Similarly to the first estimator 6001, a second estimator 6002 applies the mixed multidimensional normal distribution as the probability distribution to the second group of samples stored in the second sample storage 5002 to estimate parameters of the distribution, and the estimated parameters are stored in a second parameter part 7002.

On the other hand, when the mode selector 3 selects the estimation mode, a first probability density calculator 8001 calculates a probability density $\{Pr_1(B_t)\}$ of the sample such as $B_t$ output from the time window 2 by using the parameters stored in the first parameter part 7001 according to formula (11).

$$Pr_1(B_t) = \sum_{m=1}^{M} \lambda^{(m)} N(B_t, \mu^{(m)}, \Sigma^{(m)}) \tag{11}$$

Similarly to the first probability density calculator 8001, a second probability density calculator 8002 calculates a probability density $\{Pr_2(B_t)\}$ of a sample vector $(B_t)$ at the time t output from the time window 2 by using the parameters stored in the second parameter part 7002 according to formula (12).

$$Pr_2(B_t) = \sum_{m=1}^{M} \lambda^{(m)} N(B_t, \mu^{(m)}, \Sigma^{(m)}) \tag{12}$$

A likelihood calculator 9001 calculates a likelihood $\gamma(B_t)$ corresponding to the boundary of the sample data at the time t by using the probability densities $\{Pr_1(B_t)\}$ and $\{Pr_2(B_t)\}$ calculated in the first and second probability density calculators 8001 and 8002 according to formula (13).

$$\gamma(B_t) = \frac{Pr_2(B_t)}{Pr_1(B_t)} \tag{13}$$

When the sample data $B_t$ is cut out by the time window with the boundary at its center, the probability density $Pr_2(B_t)$ represented by the numerator becomes larger than the probability density $Pr_1(B_t)$ represented by the denominator and the value of this formula is expected to be larger than 1. On the contrary, when the sample data $B_t$ is cut out by the window with the steady part at its center, the probability density $Pr_2(B_t)$ represented by the numerator becomes smaller than the probability density $Pr_1(B_t)$ represented by the denominator and the value of this formula is expected to be smaller than 1. Accordingly, estimation amount corresponding to the boundary in the speech at each time can be obtained.

Next, an evaluation experiment of the above-described system will now be described.

Figure 2:
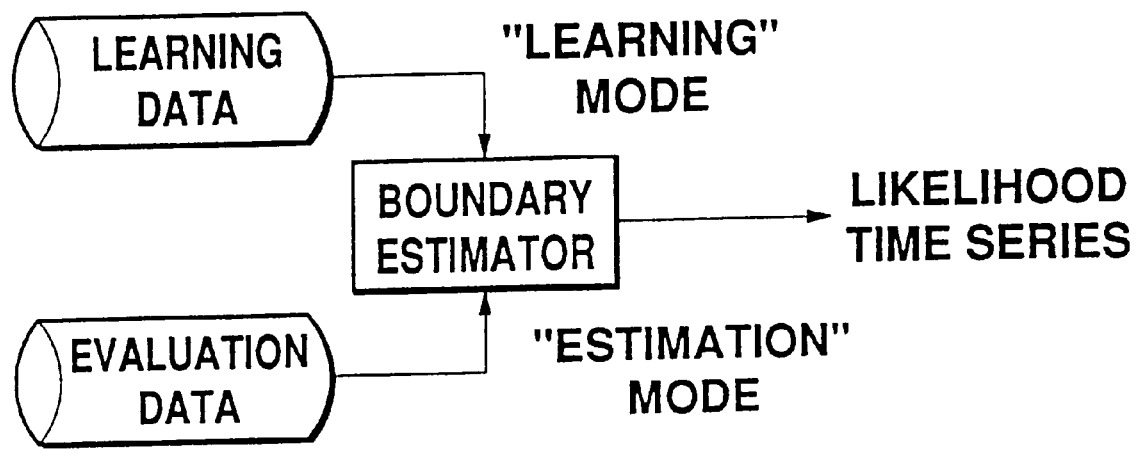
FIG. 2 is a block diagram of a device for executing an evaluation experiment method for the first embodiment of the present invention.

FIG. 2 schematically shows an experimental method. It is assumed that learning data for cutting out a boundary sample and a non-boundary sample for use in the learning is a part or the whole of the 503 phonetic balance sentences spoken by one female speaker.

The first 50 sentences of the phonetic balance 503 sentences are used for the evaluation against the learning data, and the first 50 sentences of international conference inquiry 115 sentences spoken by a word unit are used for the evaluation against the unlearning data. The phonemes are 29 kinds of "a, i, u, e, o, y, w, j, cl, p, t, k, ch, ts, s, sh, h, f, * cl, b, d, g, z, dj, j, n, r, N, #".

FIG. 3 shows the phonemes and their phonetic boundaries in the first sentence "arayuru gendjitsuo subete jibunnohoe nejimagetanoda" (He twisted all actualities entirely to his own advantage.) of the 503 phonetic balance sentences used for the learning by frame numbers. The boundaries of the phonemes are obtained by correcting a result of an automatic labeling by means of inspection and are stored as a part of the learning data in advance.

FIG. 4 illustrates how to cut out the samples, and the boundary samples are cut out around the phonetic boundaries, as shown by #.a, a.r, r.a and the like in FIG. 4. Also, the non-boundary samples are cut out around the centers of the phonetic sections continuing for at least two frames, as shown by a.a, r.r, a.a and the like in FIG. 4.

FIG. 5 shows the relationship between the sentence numbers used for the learning and the boundary and the non-boundary samples used for the learning.

In the learning mode, the learning is executed under the conditions such as the learning sentence number is 200, the number (hereinafter referred to as dimension number and designated as symbol "N") of the melcepstrum coefficients output from the feature extractor 1 is 8, the window width (T) as the frame number of the melcepstrum coefficients put together in the time window 2 is 10, and the mixing number (M) of the multidimensional normal distributions of the elements of the mixed multidimensional normal distribution applied in the first and second estimators 6001 and 6002 is 4. Thereafter, in the estimation mode, when the learning data shown in FIG. 3 are input as the input speech, FIG. 6 shows time variations of a logarithmic value log $Pr_1(B_t)$ of the output of the first probability density calculator 8001, a logarithmic value log $Pr_2(B_t)$ of the output of the second probability density calculator 8002, and a logarithmic value log $\gamma(B_t)$ of the output obtained in the likelihood calculator 9001.

In FIG. 6, $C_0$ and $\Delta C_0$ show a zero demension term of the melcepstrum coefficient and a time varying rate thereof, respectively. Further, small circles indicate the detection positions of the phonetic boundaries detected in an evaluation to be hereinafter described. In FIG. 6, I (addition or insertion) and D (deletion) shown as Errors represent detection errors. The detection positions of the phonetic boundaries are determined to the maximum points in the sections where the logarithmic likelihood ratio function log $\gamma(B_t)$ is positive.

The evaluation is performed by the deletion rate and the insertion rate. The deletion rate is obtained by indicating the rate of the correct answer boundaries where no boundary is detected within adjacent three frames including the preceding, the present and the following frames, by percentage. The insertion rate is obtained by indicating the occurrence rate of the remaining excessive boundaries not corresponding to the correct answer boundaries by percentage. The experiment results are shown in FIG. 7 to FIG. 10.

FIG. 7 shows the result while the mixing number M is varied when the learning sentence number is 200, the window width is 10 and the dimension number N is 8. From this figure, it is readily understood that the deletion becomes minimum against the non-learning data when the mixing number M is 4.

FIG. 8 shows the result while the window width is varied in the range 6 to 16 when the learning sentence number is 200, the dimension number N is 8 and the mixing number M is 4. From this figure, it is readily understood that the deletion becomes minimum against the non-learning data when the window width is 10.

FIG. 9 shows the result while the dimension number N is varied when the learning sentence number is 200, the window width is 10 and the mixing number M is 4. From this figure, it is readily understood that the deletion becomes minimum against the non-learning data when the dimension number N is 8.

FIG. 10 shows the result while the learning sentence number is varied between 100 and 503 sentences when the window width is 10, the dimension number N is 8 and the mixing number M is 4. From this figure, it is readily understood that the deletion becomes minimum against the non-learning data when the learning sentence number N is 200 but the error of the total becomes minimum when the learning sentence number is 503.

From the aforementioned results, it is understood that the window width is preferably approximately 10 frames in order to reduce the deletion to a small value, that by increasing the learning data, the deletion is increased but the insertion is reduced and the error of the total is reduced, and that the dimension number is preferably approximately 8.

The second embodiment of the present invention will now be described.

Figure 11:
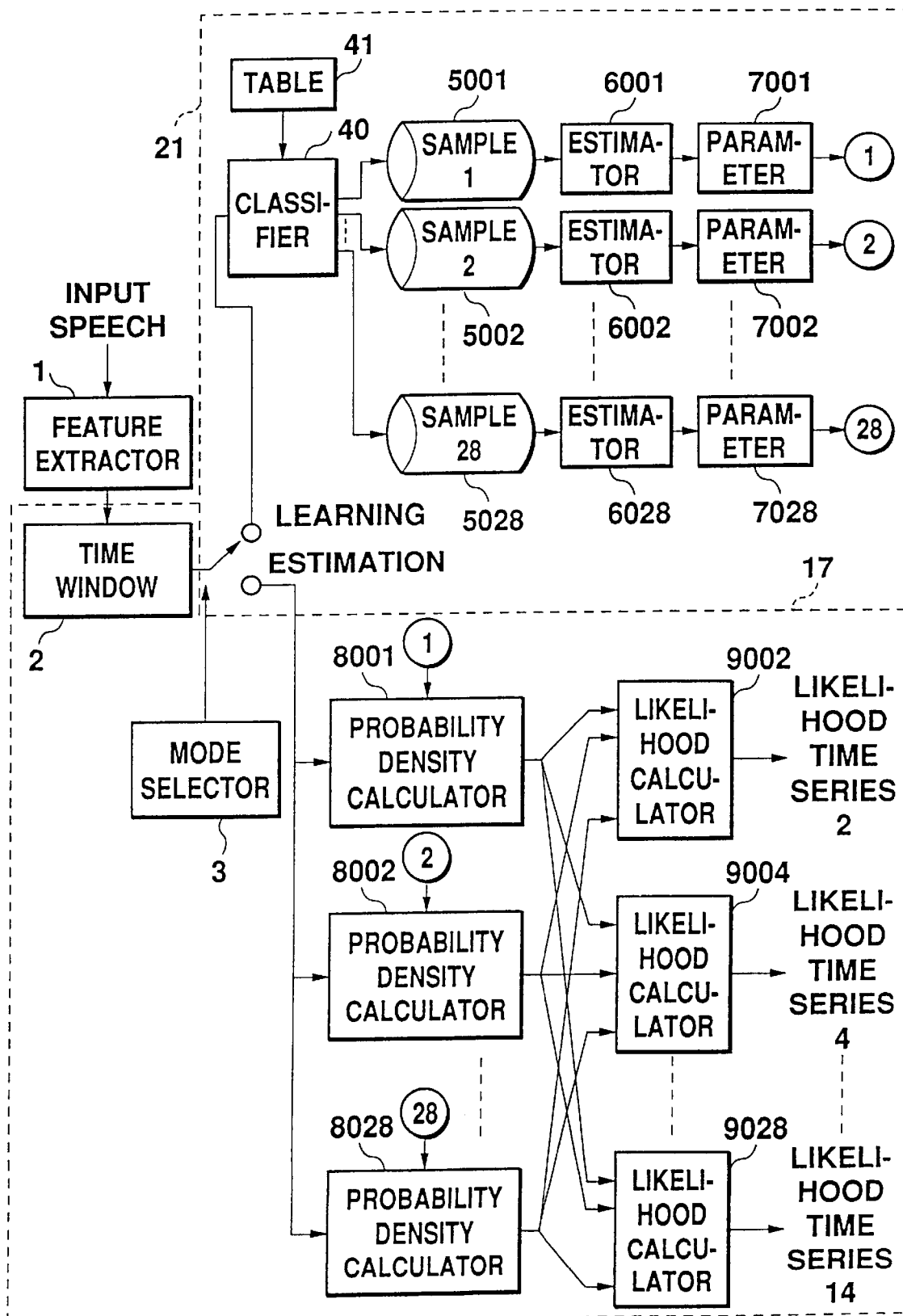
FIG. 11 is a block diagram showing a second embodiment according to the present invention, that is, a first embodiment of a method of estimating boundaries in speech.

In this embodiment, in order to improve the estimation accuracy of the boundaries against a short event, for example, a phoneme "r" of the r series of the Japanese language, which it is difficult to estimate in the aforementioned first embodiment, the boundaries of the input and output passages of the phoneme "r" are may be separately estimated by using different probability distributions. FIG. 11 illustrates the second embodiment of the present invention, that is, a system for performing the second embodiment of a boundary estimation method.

In FIG. 11, a feature extractor 1, a time window 2 and a mode selector 3 are the same as those of the first embodiments and the description thereof can be omitted for brevity. When the mode selector 3 sets the "learning" mode, a classifier 40 refers to a table 41 and classifies the samples output from the time window 2 into 28 groups. In FIG. 12, there is shown the contents of the table 41. In the column of "phonemes" of the table 41, in the case of the boundary sample, a phonetic name of the left hand side (preceding side) of the boundary is written and in the case of the non-boundary sample, its phonetic name is written. Also, in the column of "boundary samples" of "classification numbers", classification numbers allocated to the boundary samples are written and similarly, in the column of "non-boundary samples", classification numbers allocated to the non-boundary samples are written.

For example, a word "arayuru" spoken in Japanese ("any" in English) is, when represented as a phonetic series, analyzed into "a-ra-yu-ru". In the case of the boundary sample corresponding to the boundary between the phonemes "r" and "a" in this phonetic series, since the left hand side phoneme of the boundary is "a", a classification number 2 of the "boundary sample" is retrieved from the table 41 and hence the boundary sample is stored into a second sample storage 5002. In case of a non-boundary sample obtained from a steady part of the phoneme "y", since it corresponds to the y, w, j in the column "phonemes", a classification number 11 of this non-boundary sample is retrieved from the table 41 and the non-boundary sample is stored into an eleventh sample storage 5011.

After the classification of all samples of the whole learning data is finished, each of estimators 6001 to 6028 applies a mixed multidimensional normal distribution as a probability distribution model to the sample stored in each of the sample storages 5001 to 5028 to estimate a parameter of the distribution. The estimated parameters are stored into corresponding parameter parts 7001 to 7028.

On the other hand, when the mode selector 3 sets the "estimation" mode, probability density calculators 8001 to 8028 calculate probability densities $Pr_1(B_t)$ to $Pr_{28}(B_t)$ of the sample vectors $B_t$ output from the time window 2 by using the parameters stored in the parameter parts 7001 to 7028. Next, 14 likelihood calculators 9002, 9004, ..., 9028 calculate likelihoods $\gamma_2(B_t), \gamma_4(B_t), \ldots, \gamma_{28}(B_t)$ as degrees of the boundaries of the respective classifications for the samples $B_t$ by using the probability densities $Pr(B_t|1)$ to $Pr(B_t|28)$ output from the respective probability density calculator 8001 to 8028 according to formula (14).

$$\gamma_k(B_t) = \frac{Pr_k(B_t)}{\frac{1}{(K-1)}\sum_{i=1,i\neq k}^{K} Pr_i(B_t)} \quad (14)$$

Wherein k=2, 4, 4, ..., and k=28

In this formula, a numerator represents the probability density of the phonetic boundary of the k-th classification and the denominator represents the average value of the probability densities of the phonetic boundaries and the non-phonetic boundaries of the other classifications except the k-th classification. Hence, according to this formula, for example, when the sample $B_t$ is cut out around the boundary from the phoneme "a" to the phoneme "r" by the time window 2, since the preceding phoneme of the boundary is "a", this boundary is classified to the classification number 2 from the table contents shown in FIG. 12. Thus, the output of the likelihood calculator 9002 corresponding to the classification k=2 becomes larger than 1 and the outputs of the other likelihood calculators corresponding to the other classifications k=4, 6, ..., 28 are expected to be smaller than 1.

As described above, in this embodiment, the boundaries in the speech can be independently estimated depending on the kinds of the boundaries and regarding the short event of the duration in the speech, the boundaries of the input passage and the output passage can be separately detected.

Next, an evaluation experiment of this embodiment will be described. The method of the experiment is the same as the first embodiment described above. In this embodiment, the whole phonemes are classified into 14 and the samples are classified into the phonetic boundary samples and the non-phonetic boundary samples depending on the classifications to which the preceding phonemes belong. The boundary detection experiment due to the mixed distribution of the total 28 is performed. The learning sample numbers are shown in FIG. 13 and the result is shown in FIG. 14.

In FIG. 14, the first line shows the boundary detection result obtained by using the output of the likelihood calculator 9002 and the fourteenth line shows the boundary detection result obtained by using the output of the likelihood calculator 9028. For non-learning data, a result of a deletion rate 4.7% has been obtained.

In this embodiment, although the melcepstrum coefficients are used as the speech analyzer, other speech parameters can be used. In this embodiment, although the detection of the boundary of the phonemes in the speech has been described, for example, the present invention can be used for a detection of boundaries of syllables.

Further, as described above, as the method for performing a large vocabulary of the speech recognition, there are two methods. That is, in one method, after the input speech is segmented into the phonemes in advance, the likelihood is calculated for every phoneme and the likelihood of the whole speech relating to the connection of the possible phonemes is calculated to recognize the input speech. In another method, the segmentation of the speech is not executed and the likelihoods of the connection model of the possible phonemes and the whole speech are calculated to recognize the input speech. Moreover, a further method can be considered and in this method, by combining the segmentation information of the former with the probability model in the framework of the latter, it is intended to improve the performance of the speech recognition. That is, by handling the segmentation in the probability manner in the latter method, the defect where by that the error of the segmentation is fatal in the former method is solved and the advantage of the former method, that is, the small calculation amount is utilized. Hence, it can be considered that the surplus calculation ability saved by the reduction of the calculation amount is used for the expansion of the search space to improve the recognition accuracy. In order to achieve this method, it is necessary to estimate the boundaries of the voices in the speech in a definite by a not so completely definite manner with some ambiguity. In this case, the present invention can be effectively applicable.

The third embodiment of the present invention will now be described in connection with a speech recognition apparatus.

Figure 15:
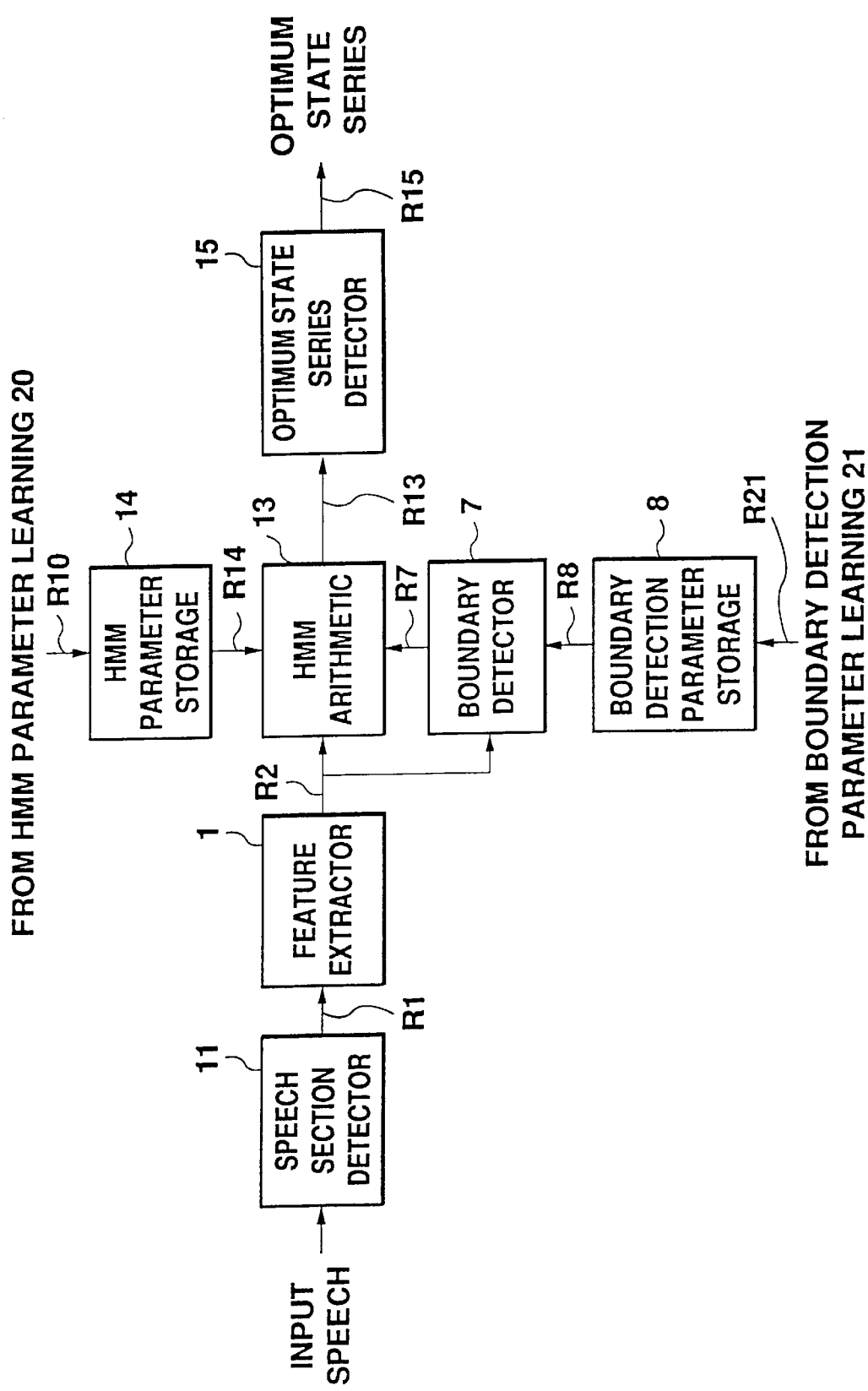
FIG. 15 is a block diagram of a third embodiment according to the present invention, that is, a first embodiment of a speech recognition apparatus.

FIG. 15 shows one embodiment of a speech recognition apparatus according to the present invention. In this embodiment, as phonetic model series, an HMM in which one phoneme is assigned to one state is used. Also, as a model arithmetic means, an HMM arithmetic means based on the Viterbi algorithm is used. Further, the formation of the boundaries of the phonetic model series appears as interstate transition of the HMM of the phonetic model series.

Furthermore, against a plurality of phonetic model series prepared by a model arithmetic means, a phonetic series transform means detects the optimum state series to select the model series.

In FIG. 15, a speech section detector 11 detects a speech section by a power calculation of an input speech and cuts out a speech signal R1 within this speech section to feed the speech signal R1 to a feature extractor 1. The feature extractor 1 extracts a feature parameter time series R2 composed of melcepstrum coefficients of 0 to 10 dimensions every 10 ms from the speech signal R1 within the speech section by a 15 dimensional linear prediction melcepstrum analysis using a time window of 25.6 ms and sends the extracted feature parameter time series R2 to an HMM arithmetic means 13 as a phonetic model arithmetic means and a boundary detector 7.

Figure 16:
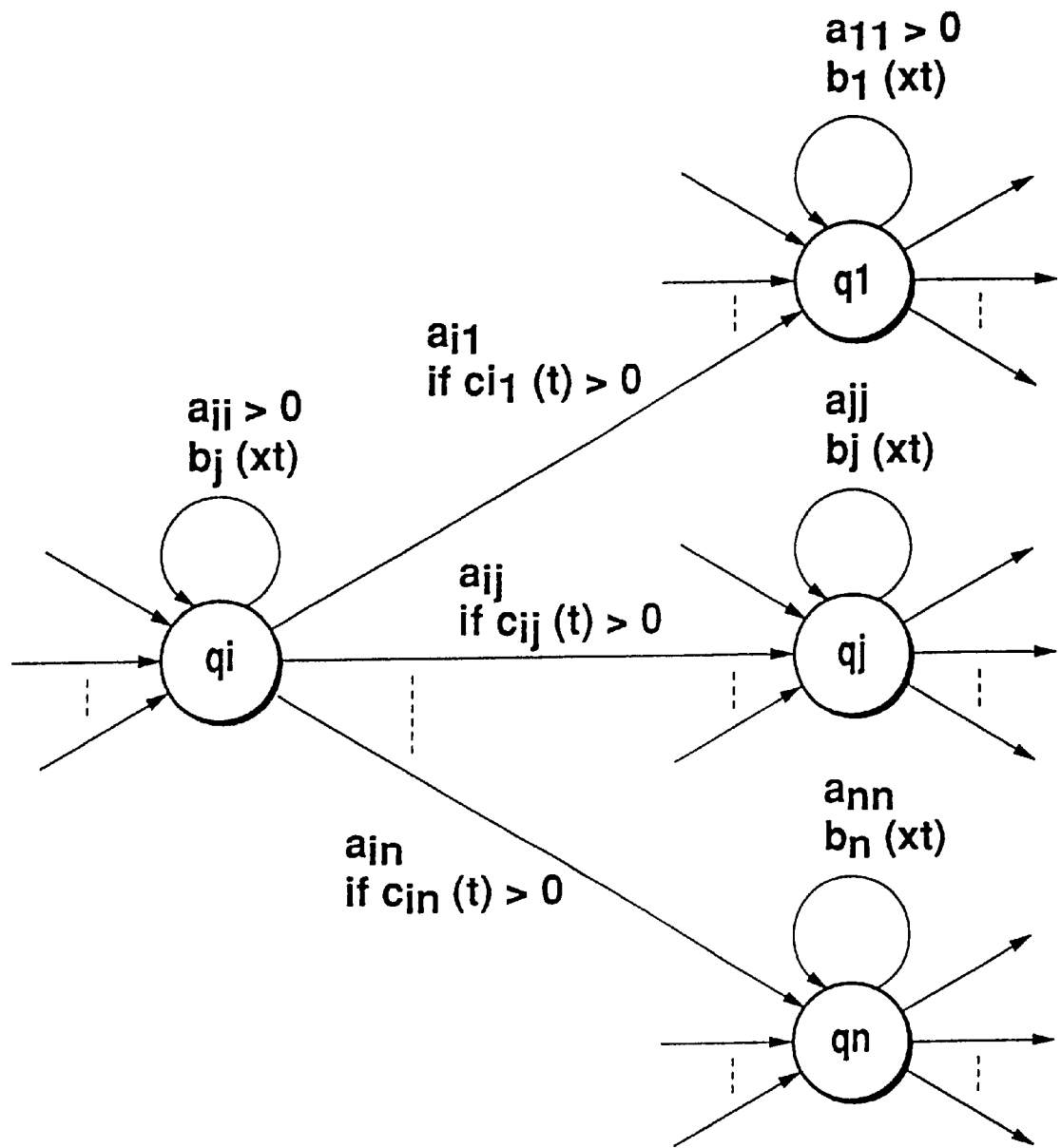
FIG. 16 is a schematic view showing a structure of an HMM in the third embodiment of the present invention.

FIG. 16 illustrates the typical structure of the HMM as a phonetic model series in this embodiment. This HMM includes n states (n=29) and the states correspond to 29 kinds of phonemes, as shown in FIG. 17. A transition probability from the state i to the state j is indicated by $a_{ij}$ and an output probability in the state j of a feature parameter $x_t$ at a time t is shown by $b_j(x_t)$. The output probability $b_j(x_t)$ is represented by a mixed distribution composed of 8 element Gaussian distributions and is calculated by using parameters such as an average vector $\mu_{mj}$ and a covariance matrix $\Sigma_{mj}$ of the m-th element Gaussian distribution and a branch probability $\lambda_{mj}$ according to formula (15)

$$b_j(x_t) = \sum_{m=1}^{M} \lambda_{mj} N(x_t, \mu_{mj}, \Sigma_{mj}) \quad (15)$$

wherein $N(x_t, \mu_{mj}, \Sigma_{mj})$ represents a probability density function of a Gaussian distribution.

Figure 18:
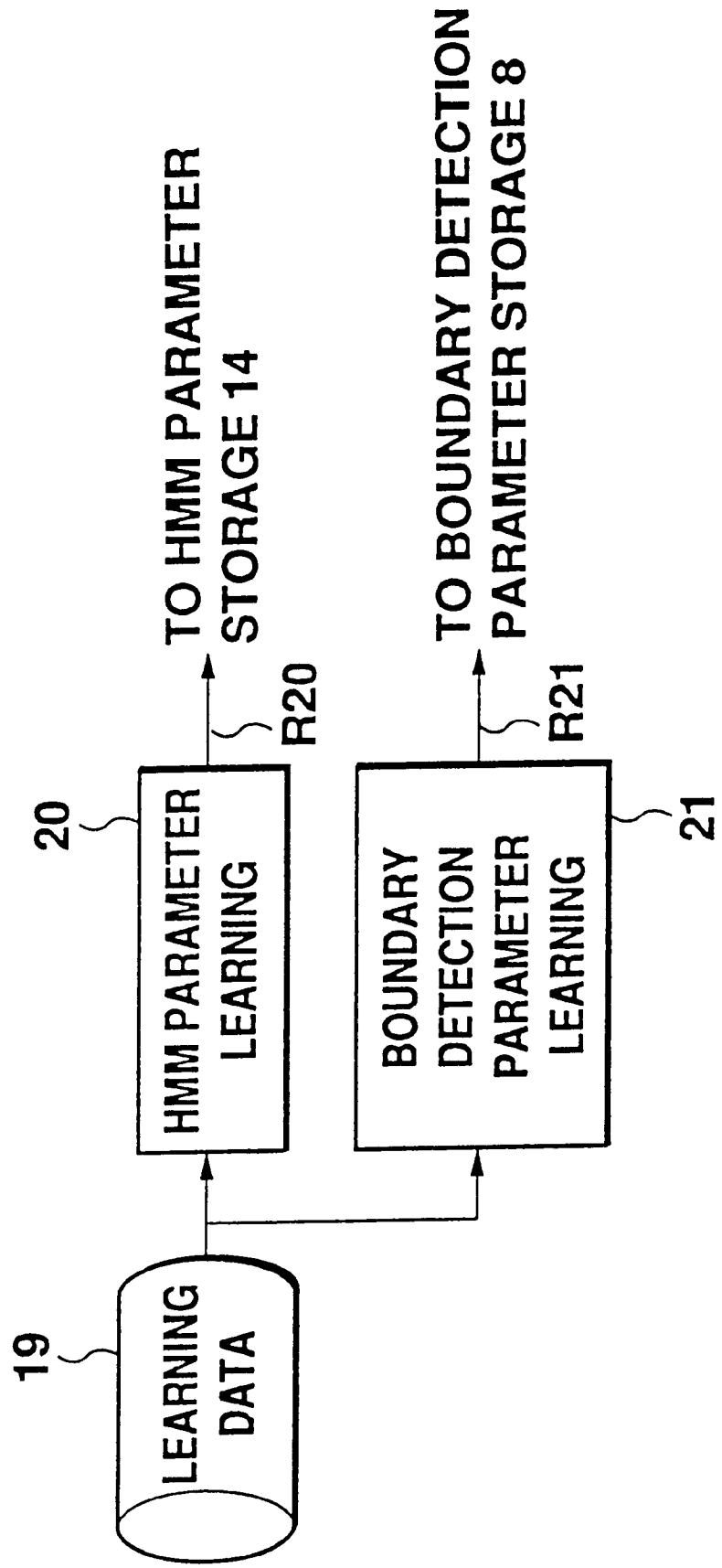
FIG. 18 is a block diagram of a learning means in the third embodiment of the present invention.

The transition probability $a_{ij}$ and the parameters ($\mu_{mj}$, $\Sigma_{mj}$ and $\lambda_{mj}$; j=1, 2, ..., n; m=1, 2, ..., M) for the output probability calculation are previously calculated from learning data 19 by an HMM parameter learning means 20, as shown in FIG. 18 and are stored in the HMM parameter storage 14.

As described above, the structure of the HMM is almost the same as a conventional HMM. The HMM, different from the conventional HMM, usually restricts the transition between the states as the formation of the boundaries of the phonetic model series so that, referring to a variable $C_{ij}(t)$, only when $C_{ij}(t)>0$, the HMM may allow the transition during an interstate transition from the state i to the state j at the time t.

In this case, the variable $C_{ij}(t)$ is determined so as to be $C_{ij}(t)>0$ at a phonetic boundary corresponding to the transition from the state i detected by the boundary detector 7 to the state j or a region near this phonetic boundary before the HMM calculation, as hereinafter described. Next, the boundary detector 7 and the HMM arithmetic means 13 will be successively described.

Figure 19:
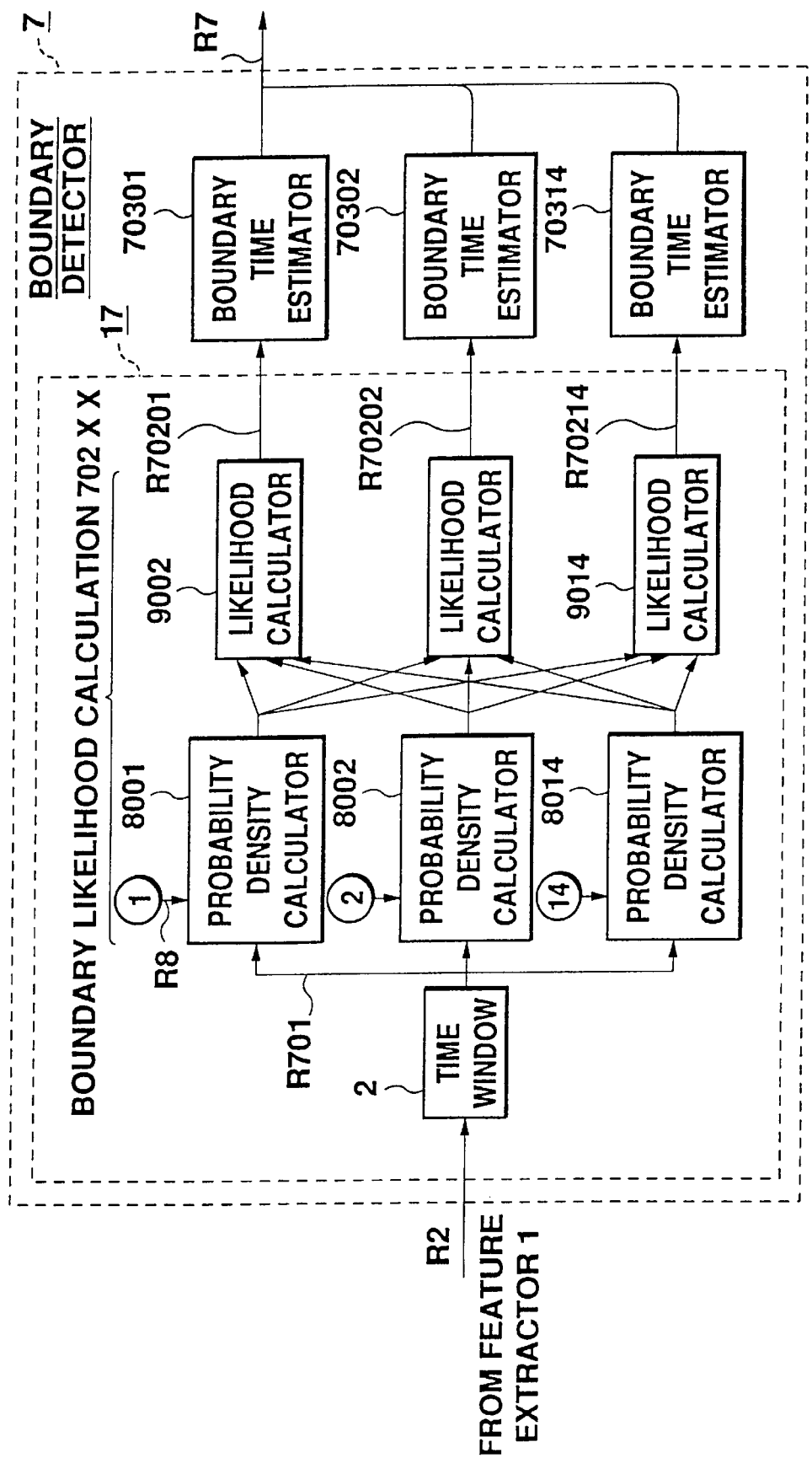
FIG. 19 is a block diagram of a boundary detector in the third embodiment of the present invention.

In this embodiment, the boundary detector 7 detects a phonetic boundary in the speech corresponding to the category of the phonetic boundary on the basis of the method described in the first and second embodiments or a region near the phonetic boundary. The boundary detector 7 is constructed, as shown in FIG. 19. In this case, boundary time estimators 70301 to 70314 are further provided compared with FIG. 11. Now, the correspondence relationship between the categories of the phonetic boundaries and the kinds of the phonetic boundaries are shown in FIG. 20.

The principle of the detection of the phonetic boundaries will be simply described as follows. That is, as to fixed length segments extracted from the input feature parameter time series, the degree belonging to a first class (represented by c=1) having a phonetic boundary of the category k in its center and a second class (represented by c=0) having no phonetic boundary of the category k in its center is calculated as a statistical probability, and by taking a logarithm of a ratio of the belonging probabilities of the fixed length segments belonging to both the classes (c=0 or c=1), the likelihood (boundary likelihood) of the existence of the boundary in the center of the fixed length segment is calculated to execute the boundary detection from the form of the time series of the boundary likelihood.

In FIG. 19, from the feature parameter time series R2, the time window (fixed length segment extractor) 2 extracts 0 to 7 dimensions of 80 (=10 frames×8 dimensions) melcepstrum coefficients in total in a range of the time width 10 frames around the time t at the time =1, 2, ..., T as one vector (hereinafter referred to as a fixed length segment) in terms of the sample. The boundary detector 7 outputs the time series R7 of these fixed length segments. (Hereinafter, the fixed length segment at the center time t is referred to as $B_t$.)

In a boundary detection parameter storage 8, boundary detection parameters R8 learned from the learning data 19 by a boundary detection parameter learning means 21 are already stored, as shown in FIG. 18. The boundary detection parameters R8 are an average vector $\mu_{mck}$ a covariance matrix $\Sigma_{mck}$ and a branch probability $\lambda_{mck}$ as parameters of the m-th element Gaussian distribution constituting a distribution (fixed distribution) of the fixed length segments of the classes c (c=0, 1) of the categories k (k=1, 2, ..., K).

In this case, the number M of the element distributions constituting the mixed distribution of each class of each category is 4 and the number K of the categories of the phonetic boundaries is 14.

In FIG. 19, boundary likelihood calculators 70201 to 70214 (corresponding to the probability density calculators and the likelihood calculators shown in FIG. 11), which correspond to the categories of the phonetic boundaries, input the time series R701 of the fixed length segments and calculate the likelihoods (boundary likelihoods) that each phonetic boundary in the speech exists in the center of each fixed length segment on reference to the boundary detection parameters R8 to output as a boundary likelihood time series R70201 to R70214 to the boundary time estimators 70301 to 70314.

Since the boundary likelihood calculators 70201 to 70214 have the same structure and function, it is sufficient to explain about only the boundary likelihood calculator 70201.

Figure 21:
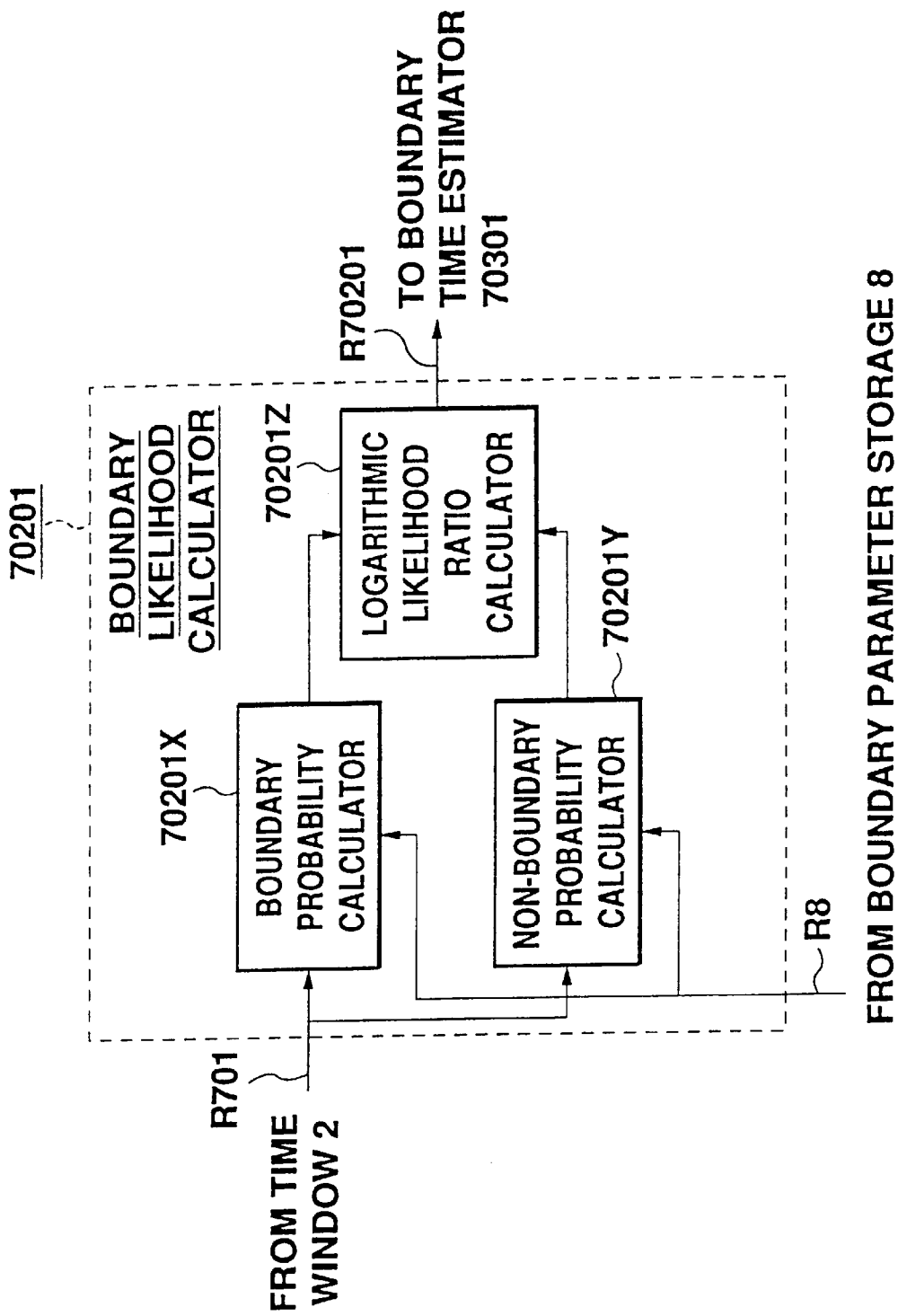
FIG. 21 is a block diagram of a boundary likelihood calculator of the boundary detector in the third embodiment of the present invention.

FIG. 21 shows one embodiment of the boundary likelihood calculator 70201. In FIG. 21, a boundary probability calculator 70201X calculates a probability $Pr_k(B_t)$ of the fixed length segment $B_t$ belonging to the class (c=1) having the phonetic boundary of the category k in its center according to formula (16), and a non-boundary probability calculator 70201Y calculates a probability $Pr_k(B_t, 0)$ of the fixed length segment $B_t$ belonging to the class (c=0) having no phonetic boundary of the category k in its center according to formula (17). Further, a logarithmic likelihood calculator 70201Z calculates a boundary likelihood as a logarithmic likelihood ratio of the probabilities $Pr_k(B_t)$ and $Pr_k(B_t, 0)$ calculated in the boundary and non-boundary probability calculators 70201X and 70201Y according to formula (18).

$$Pr_k(B_t, 1) = \sum_{m=1}^{M} \lambda_{mIk} N\mu_{mIk}(B_t, \Sigma_{mIk}) \tag{16}$$

$$Pr_k(B_t, 0) = \frac{1}{2K-1}\left\{\sum_{k=1}^{K}\sum_{m=1}^{M} \lambda_{mOk} N\mu_{mOk}(B_t, \Sigma_{mOk}) + \sum_{k=1, k\neq K}^{K}\sum_{m=1}^{M} \lambda_{mIk} N(B_t \mid \mu_{mIk}, \Sigma_{mIk})\right\} \tag{17}$$

$$\gamma_k(B_t) = \log\frac{Pr_k(B_t, 1)}{Pr_k(B_t, 0)} \tag{18}$$

Figure 22:
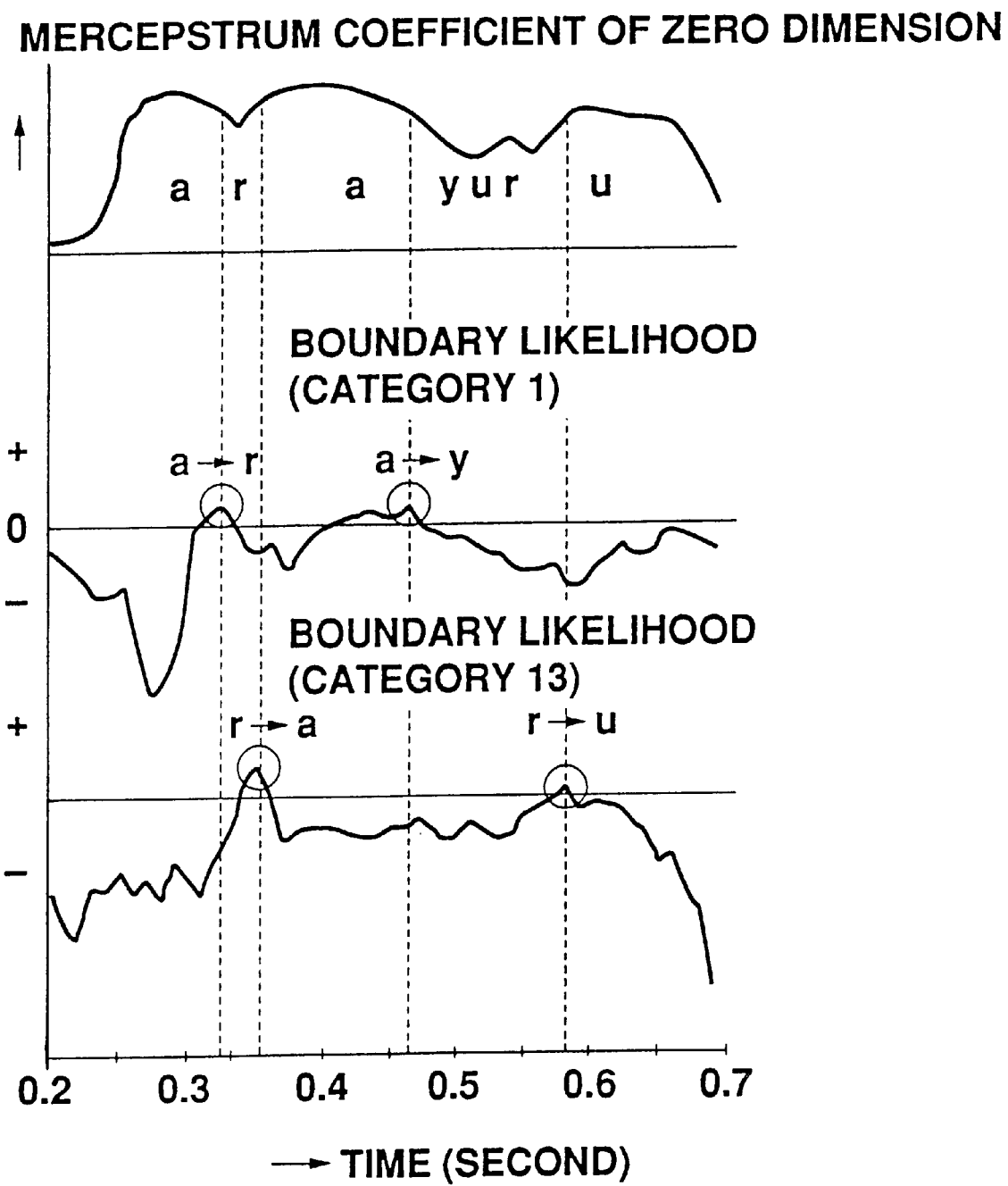
FIG. 22 is a schematic diagram explaining an estimation method of boundary time in the third embodiment of the present invention.

In this embodiment, FIG. 22 shows a time variation of a melcepstrum coefficient (nearly corresponding to the intensity of the sound) of 0 dimension of the input speech, the boundary likelihood time series R70201 ($\gamma_5(B_t)$) corresponding to the phonetic boundaries of the category 1 and the boundary likelihood time series R70213 ($\gamma_{13}(B_t)$) corresponding to the phonetic boundaries of the category 13 when the speech "a-ra-yu-ru" spoken in Japanese is input. As can be readily understood from above description, the boundary likelihood generally becomes a positive value near the boundaries of the phonemes (the phonetic boundaries are indicated by broken lines in FIG. 22) and tends to have a maximal value.

By using such tendency, the boundary time estimators 70301 to 70314 determine the maximum times in the sections where the boundary likelihood time series R70201 to R70214 of the boundaries are positive values concerning the phonetic boundaries of the category k to the estimation times of the phonetic boundaries, and based on these boundary time estimation results, the variable $C_k(t)$ is set to formula (19). (The situation of the estimation of the phonetic boundaries is indicated by small circle portions in FIG. 22.)

Figure 23:
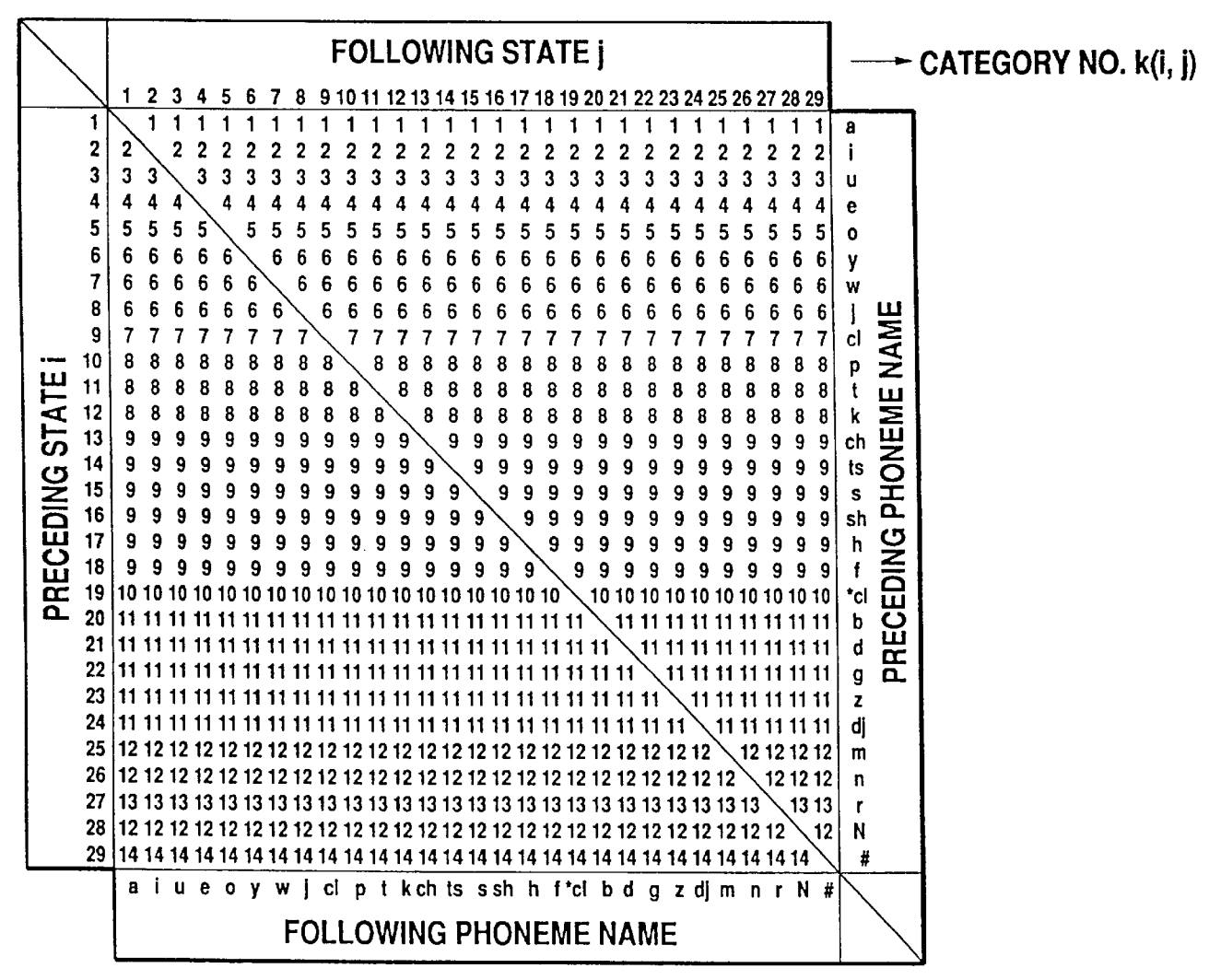

The relationship between the variable $C_k(t)$ and the variable $C_{ij}(t)$ used in the HMM calculation is expressed in formula (20). Further, k(i, j) is a function for obtaining the category number of the phonetic boundary from the state transition and can be realized by a retrieval of a table shown in FIG. 23.

$$C_k(t) = \begin{cases} 1 & (t = \text{estimation boundary time}) \\ 0 & (t = \text{the other times except the above}) \end{cases} \tag{19}$$

$$C_{ij}(t) = C_{k(i,j)}(t) \tag{20}$$

The HMM arithmetic means 13 basically executes the Viterbi algorithm similarly to the recurrence formula of the conventional basic HMM shown in formula (1). However, there is one difference from the conventional case. That is, only in the case of the state j of $C_{ij}(t)>0$ in the transition from the state i to the state j (i≠j), is the maximizing calculation executed for the state i shown by max of formula (1). The recurrence formulas are given by formulas (21) and 22).

$$\alpha(j, t) = \max_{1\leq i\leq n}\begin{cases} \alpha(i, t-1)a_{ij}bj(x_t) & (i = j \text{ or } C_{ij}(t) > 0) \\ 0 & (\text{the others}) \end{cases} \tag{21}$$

$$\beta(j, t) = \operatorname*{argmax}_{1\leq i\leq n}\begin{cases} \alpha(i, t-1)a_{ij}bj(x_t) & (i = j \text{ or } C_{ij}(t) > 0) \\ 0 & (\text{the others}) \end{cases} \tag{22}$$

Initial condition: $\alpha(i,0)=1 (i=1, 2, \ldots, n)$

Figure 24:
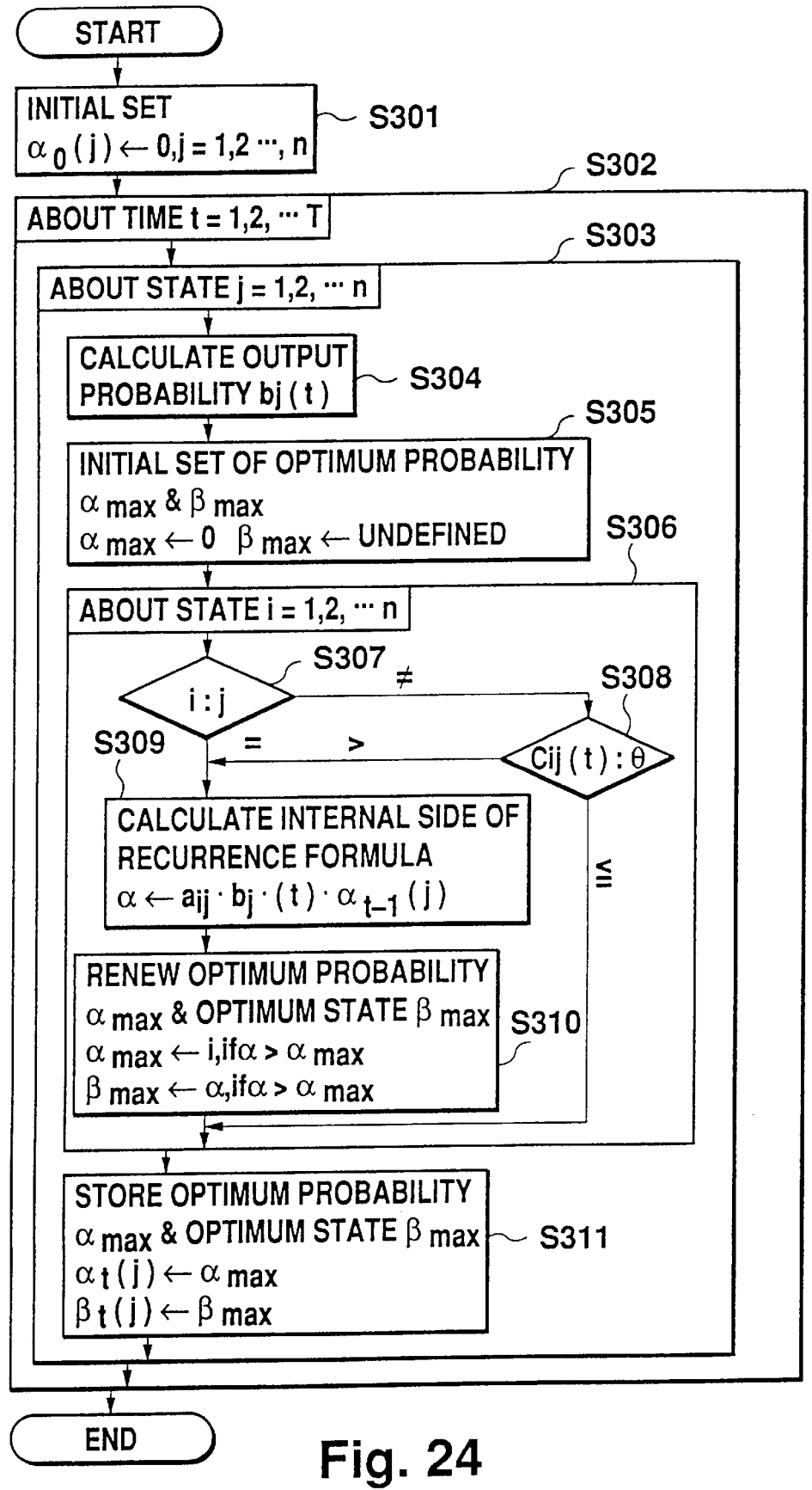
FIG. 24 is a flow chart showing an operation of an HMM calculator in the third embodiment of the present invention.

This operation will now be described in connection with a flow chart shown in FIG. 24. In step S301, the variables are initialized. In step S302, at each time t of 1 to T, step S303 is executed. In step S303, in each state j of 1 to n, steps S304 to S311 are performed. In step S304, the output probability $b_j(x_t)$ is calculated. In step S305, for maximizing calculation of formula (21), the variables are initialized.

In step S306, the inside of the maximizing calculation of formula (21) is executed, and in each state i of 1 to n, steps S307 to S310 are carried out according to some conditional judgements. In step S307, when a variable i equals a variable j, it is discriminated that it is a transition within the same state and steps S309 to S310 are executed. In turn, when the variable i is different from the variable j, it is discriminated that it is an interstate transition and first in step S308, a code of the variable $C_{ij}(t)$ is checked. When the code is positive, steps S309 to S310 are executed. In step S309, with respect to the variables i, j and t, the inside of the maximizing calculation is performed, and in step S310, the optimum values are replaced depending on the conditions. After the inside calculation of the recurrence formula is finished, in step S311, the optimum values of the variables j and t are stored.

By the above-described operation, the HMM arithmetic means 13 executes the calculation of the state transition at the time when $C_{ij}(t)$ (=$C_{k(i,j)}(t)$) is positive, that is, only at the estimation times of the phonetic boundaries detected for every category of the state transition by the boundary detector 7. Hence, in other words, the state transition can occur only at the phonetic boundary times estimated by the boundary detector 7 and thus even when no duration control is carried out, the same effect as the duration control can be obtained. Moreover, in comparison with the conventional method (formula (6)) using the duration control, it is sufficient to execute the maximizing calculation only one time and the calculation of the secondary internal for largely affecting the calculation times is simple. Hence, the calculation times in the HMM calculation can be largely reduced.

The optimum state series detector 15 as a phonetic series transform means traces the optimum state series on the basis of the values stored in the variables $\alpha(j, t)$ and $\beta(j, t)$ obtained by the calculation in the HMM arithmetic means 13. The optimum state series β hat (1), β hat (2), . . . , β hat (T) (β hat=β̂) are obtained in the same manner as the convention case by calculating recurrence formula (23).

$$\hat{\beta}(t-1) = \beta(\hat{\beta}(t), t) \quad (t = T, T-1, ..., 1) \tag{23}$$

$$\hat{\beta}(T) = \underset{1 \leq j \leq n}{\mathrm{argmax}}\alpha(j, T)$$

Figure 25:
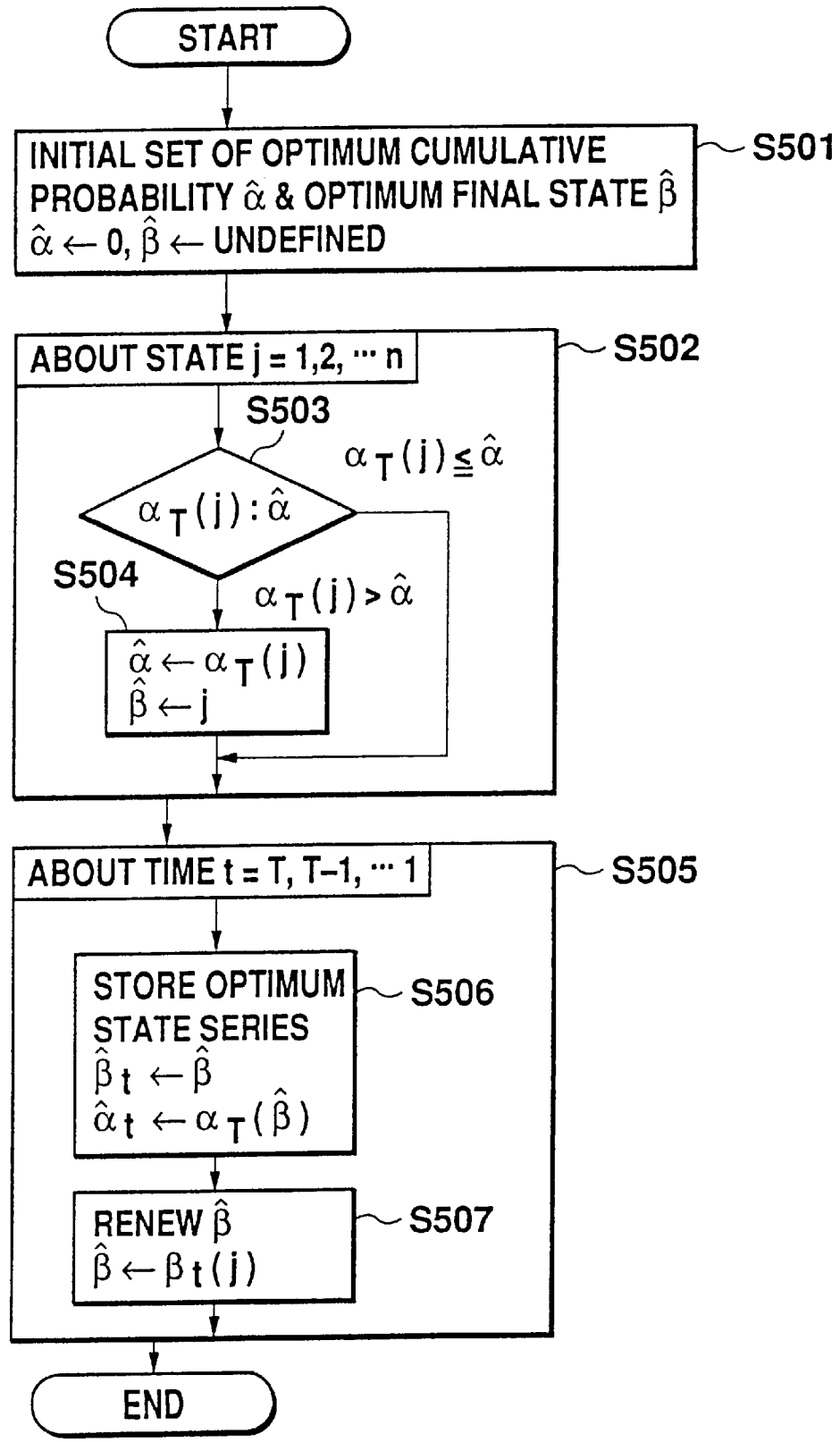
FIG. 25 is a flow chart showing an operation of an optimum state series extractor in the third embodiment of the present invention.

FIG. 25 illustrates the flow of this operation. As shown in FIG. 25, in step S501, the initialization is executed. By performing steps S502, S503 and S504, the optimum value $\max_j \alpha(j,T)$ of $\alpha(j,T)$ of the state j at the time T is calculated and is substituted into the variable α hat. Also, the optimum state $\mathrm{argmax}_j \alpha(j,T)$ corresponding to the optimum value is set to the variable β hat. In step S505, while the time t is changed in the range T to 1 from the final end T to the start end in the speech section, the storing of the optimum state series in step S506 and the renewing of the optimum states in step S507 are repeated, and after the execution of these, the optimum state series β hat (1), β hat (2), . . . , β hat (T) as the value of the variable β hat (t) are obtained.

As described above, the optimum state series detector 15 selects from the phonetic model series and determines the optimum state series.

Next, the evaluation result of this embodiment will be described. First, as shown in FIG. 18, in the learning, the parameters R20 of the HMM and the boundary detection parameters R21 are learned by using the phonetic balance 503 sentences spoken by one female speaker as the learning data.

Relating to the state transition probability $a_{ij}$, against the transition indicated by 0 within a table shown in FIG. 26, the transition is forbidden by setting $a_{ij}$=0. On the other hand, against the transition indicated by 1 within the table, the evaluation is carried out in two cases of setting $a_{ij}$=1 and $a_{ij}$=1/$n_i$ ($n_i$ is a number of the reachable states from the state i).

FIG. 27 shows the result of the recognition of the first sentence "arayuru gendjitsuo subete jibunnohoe nejimaget-anoda" in Japanese (He twisted all actualities entirely to his own advantage.) of the phonetic balance 503 sentences.

In FIG. 27, in order to better understand the result, the state numbers obtained as the optimum state series are converted into the corresponding phonetic names and the sections continuing the same phonetic names are put together and represented by one phonetic name and are shown by putting the sections between the boundary times of the front and the rear of the same. In this case, the sentence is correctly recognized except that a part "#arayuru" of the input phonemes is incorrectly read as "cltaraiu".

FIG. 28 shows the evaluation result obtained by using the first 10 sentences of the phonetic balance 503 sentences used for learning as the data for the evaluation, and the error rates of the phonemes in the phonetic series of the recognition result with respect to the phonetic series correctly recognized and their details (the types of the errors are classified into substitutions, insertions and deletions).

In FIG. 28, the "basic HMM" shows the result based on the conventional technique by the HMM calculation represented by formula (1). Also, the "gamma distribution" and the "Gaussian distribution" show the results on the basis of the conventional technique by the HMM calculation of the duration control type shown in formula (6) in which the duration distribution is represented by the gamma distribution and the Gaussian distribution. Further, concerning "VQ", when setting $a_{ij}$=1 in the basic HMM, the recognition result corresponds to the result by the vector quantization deciding the optimum phonemes every frame. It is understood from FIG. 28 that regardless of the setting method of the transition probability, the minimum error rate of 7.7% can be achieved in this third embodiment, and the present invention is superior in precision compared with the conventional method performing the duration control of the gamma distribution. Hence, the effects of the present invention can be confirmed.

The fourth embodiment of the present invention will now be described.

Figure 29:
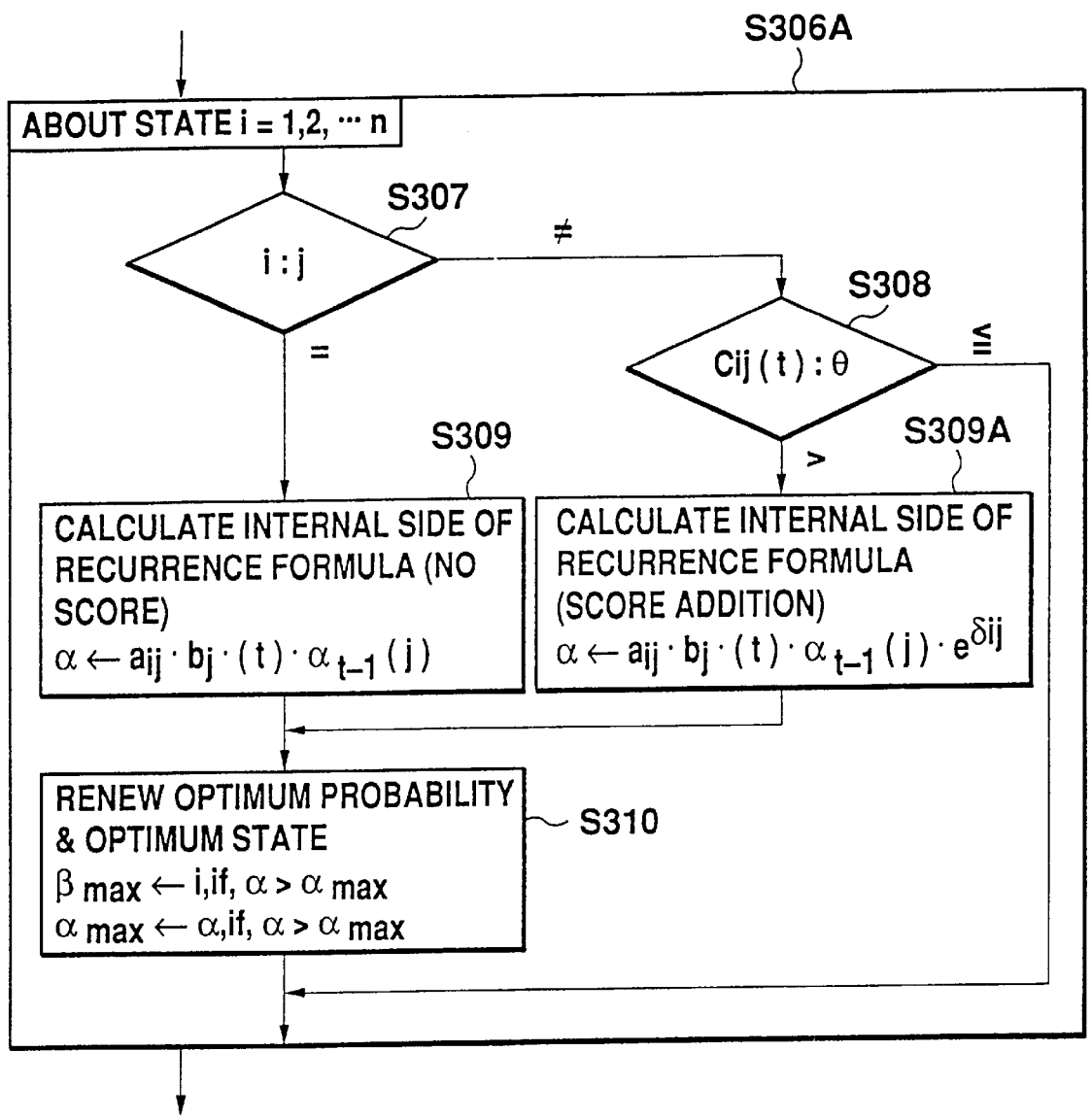
FIG. 29 is a flow chart showing a part of an operation of an HMM calculator in the fourth embodiment of the present invention.

In the above-described third embodiment, in the transition between the state i and the state j corresponding to the boundaries of the phonemes, if the condition of $C_{ij}(t)>0$ is excluded, only the transition probability $a_{ij}$ is considered and there is no function for promoting the interstate transition as the formation of the boundaries of the phonetic model series in the phonetic boundaries obtained by the boundary detector. In this embodiment, in order to effectively use the information of the phonetic boundaries obtained by the boundary detector, the interstate transition as the formation of the boundaries of the phonetic model series in the phonetic boundaries obtained by the boundary detector is promoted. More specifically, the recurrence formula (21) in the third embodiment is modified by adding a score $\delta_{ij}$ in the transition from the state i to the state j to obtain recurrence formula (24) (however, $\delta_{ij}$ =δ constant). That is, in this embodiment, step S306 shown in FIG. 24 in the third embodiment is replaced with step S306A shown in FIG. 29 and in step S308, when $C_{ij}(t)>0$, step S309A is executed in place of step S309.

$$\alpha(j, t) = \max_{1 \leq i \leq n} \begin{cases} \alpha(i, t-1)a_{ij}bj(x_t) & (i = j) \\ \alpha(i, t-1)a_{ij}bj(x_t)\exp(\delta_{ij}) & (i \neq j \ \& \ C_{ij}(t) > 0) \\ 0 & \text{(the others)} \end{cases} \tag{24}$$

FIG. 30 shows the result of the evaluation in this embodiment. The not clearly described conditions of the evaluation are the same as the evaluation described in the third embodiment. In addition, the evaluation result when the score δ is 0, is identical with the evaluation result of the third embodiment. It is readily understood from FIG. 30 that, when $a_{ij}$=1/$n_i$, the score addition effect can apparently be observed and also, when the score is 0, the error rate of 8.4% is reduced to the minimum error rate of 7.5% near the score 4. In this way, the score is added to the interstate transition as the formation of the boundaries of the phonetic model series in the phonetic boundaries detected from the time series of the feature parameters of the input speech so as to promote the formation of the boundaries of the phonetic model series.

The fifth embodiment of the present invention will be described.

In the aforementioned third and fourth embodiments, as exemplified by the small circles in FIG. 22, the boundary time estimators 70301 to 70314 execute the estimation of the phonetic boundaries at each one point of the maximal time in the positive area of the boundary likelihood time series R70201 to R70214 output from the boundary likelihood calculators 70201 to 70214. In this embodiment, by considering ambiguity of the boundary estimation, the phonetic boundary is estimated not at one point but in an area of the phonetic boundary. More specifically, in the boundary time estimators 70301 to 70314 of the fourth embodiment, it is considered that the phonetic boundaries exist in any of the positive areas (in general, areas beyond a threshold value θ) of the boundary likelihood time series R70201 to R70214

($\gamma(B_t|k)$; k=1, 2, ..., K) output from the boundary likelihood calculators 70201 to 70214, and $C_{ij}(t)$ is set to formula (25) (wherein θ=0). As a result, since the transition is allowed in the periphery at the phonetic boundary time, it is expected to be strong against the shift of the estimation in the estimation determination stages at the phonetic boundary time.

$$C_{ij}(t) = \begin{cases} 1 & (\gamma_{k(i,j)}(B_t) > 0) \\ 0 & \text{(the others)} \end{cases} \quad (25)$$

The evaluation result in this embodiment is shown in FIG. 31. The not clearly described experimental conditions are the same as the evaluation experiment in the third embodiment. In FIG. 31, when setting $a_{ij}=1/n_i$ and the score is 3.0, the minimum error rate of 7.4% can be achieved. This performance is slightly improved in comparison with the minimum error rate of 7.5% obtained in the fourth embodiment.

The sixth embodiment of the present invention will now be described.

Figure 32:
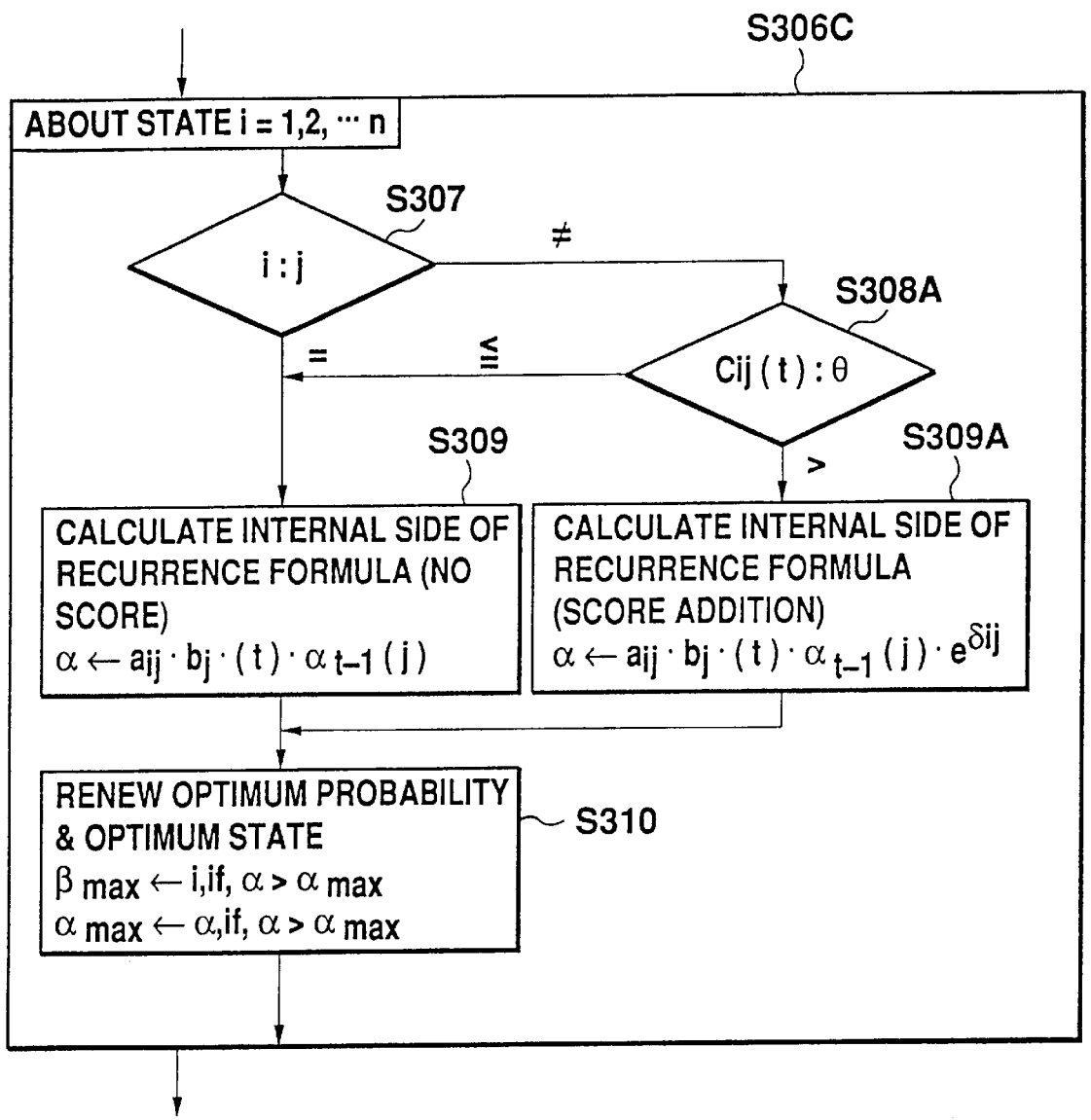
FIG. 32 is a flow chart showing a part of an operation of an HMM calculator in the sixth embodiment of the present invention.

In the above-described third and fourth embodiments, the state transition is forbidden except at the estimated phonetic boundaries and in the areas of the phonetic boundaries. In this embodiment, other state transitions are not forbidden. Instead, the score (constant) is given to the interstate transition at the estimated phonetic boundaries or in the areas of the phonetic boundaries and the interstate transition as the formation of the boundaries of the phonetic model series is promoted. More specifically, step S306 shown in FIG. 24 or step S306A shown in FIG. 29 in the third or the fourth embodiment is replaced with step S306C, as shown in FIG. 32 and further in step S308, when $C_{ij}(t) \leq 0$, step S309 is executed, which is different from where the operation is immediately ended in the third or the fourth embodiment.

FIG. 33 shows the evaluation results for this embodiment. The not clearly described experimental conditions are the same as the evaluation experiment in the third embodiment. Unfortunately, the obtained accuracy becomes less than or equal to the result of the basic HMM shown in FIG. 28. In this embodiment, it is understood that the precision improvement is not as good as with reference to the third embodiment. Hence, as in the above-described third to fifth embodiments, it can be understood that the method for allowing the interstate transition of the phonetic model series only at the phonetic boundaries estimated from the input speech or in the areas of the phonetic boundaries is the most effective part in the present invention.

The seventh embodiment of the present invention will now be described.

Figure 34:
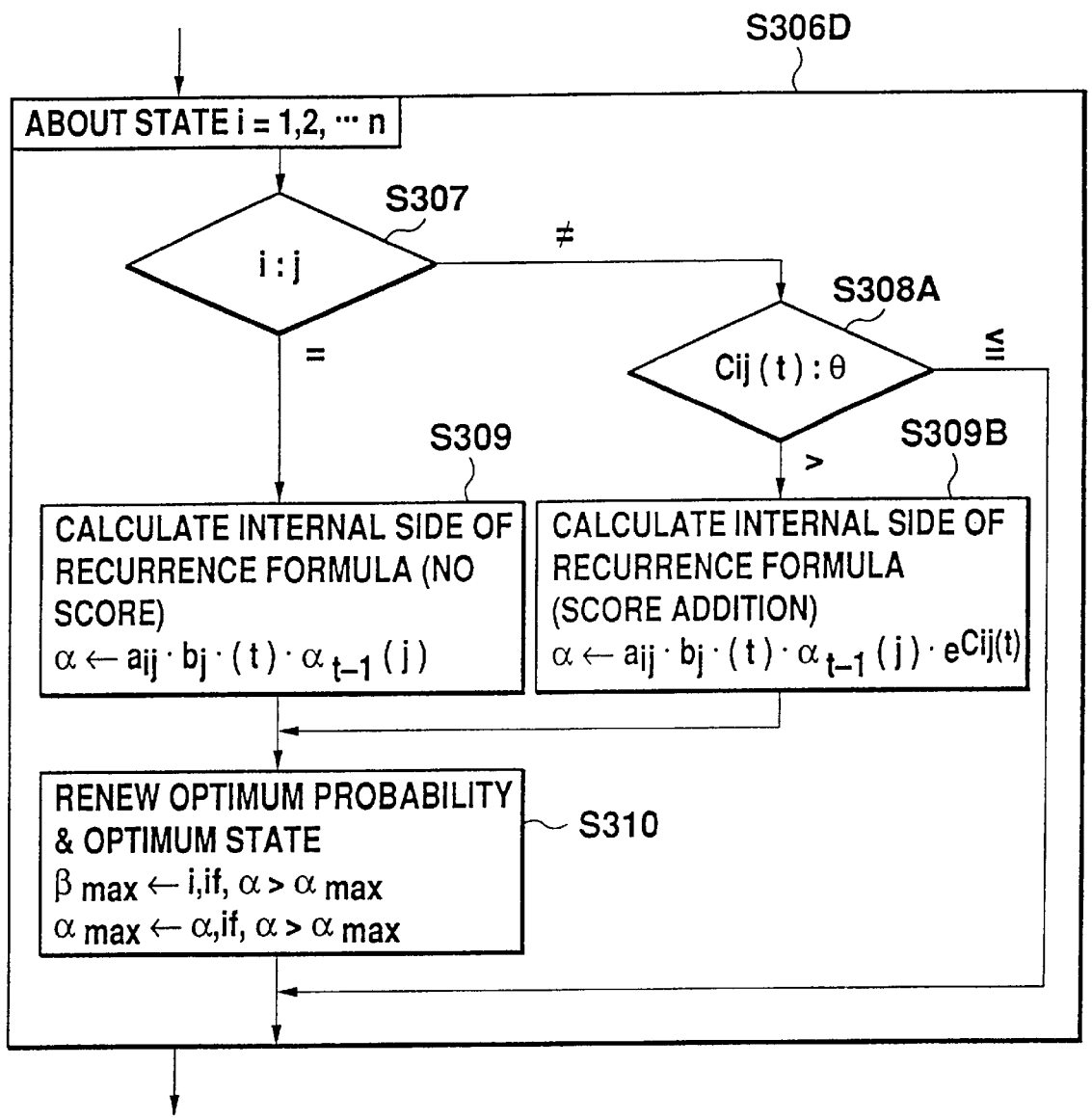
FIG. 34 is a flow chart showing a part of an operation of an HMM calculator in the seventh embodiment of the present invention.
Figure 36:
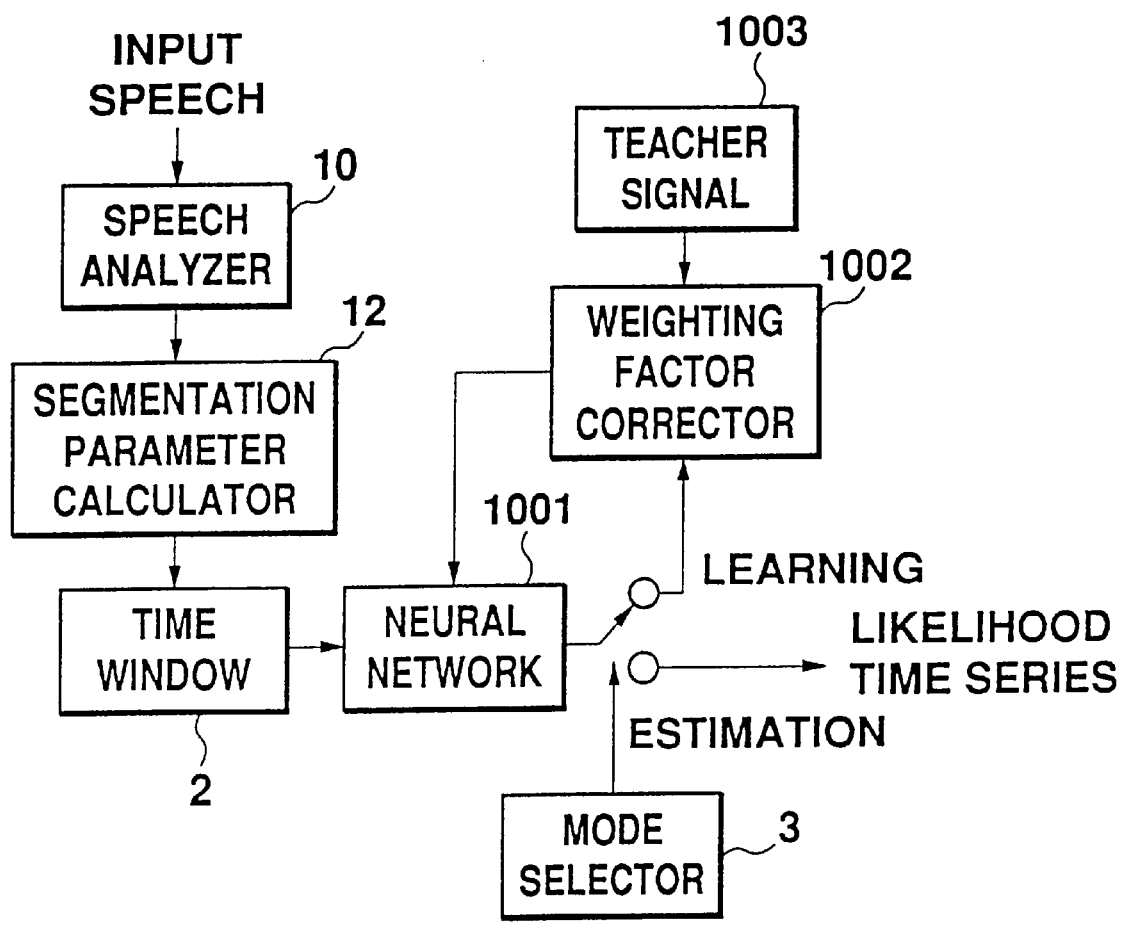
FIG. 36 is a block diagram showing a conventional estimation method of boundaries in speech.
Figure 37:
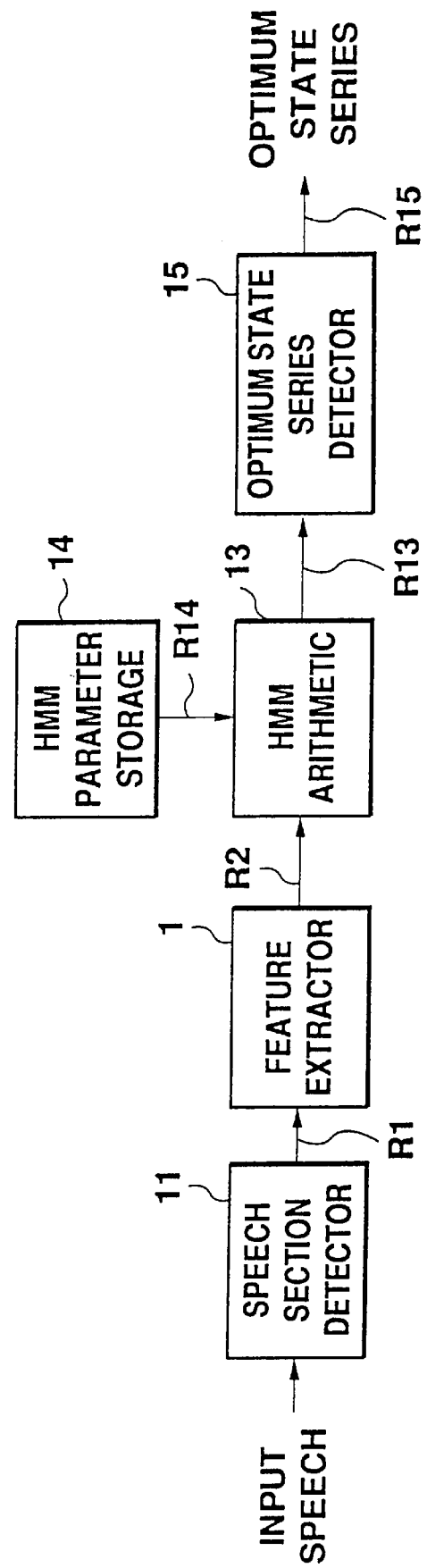
FIG. 37 is a block diagram of a conventional speech recognition apparatus.
Figure 38:
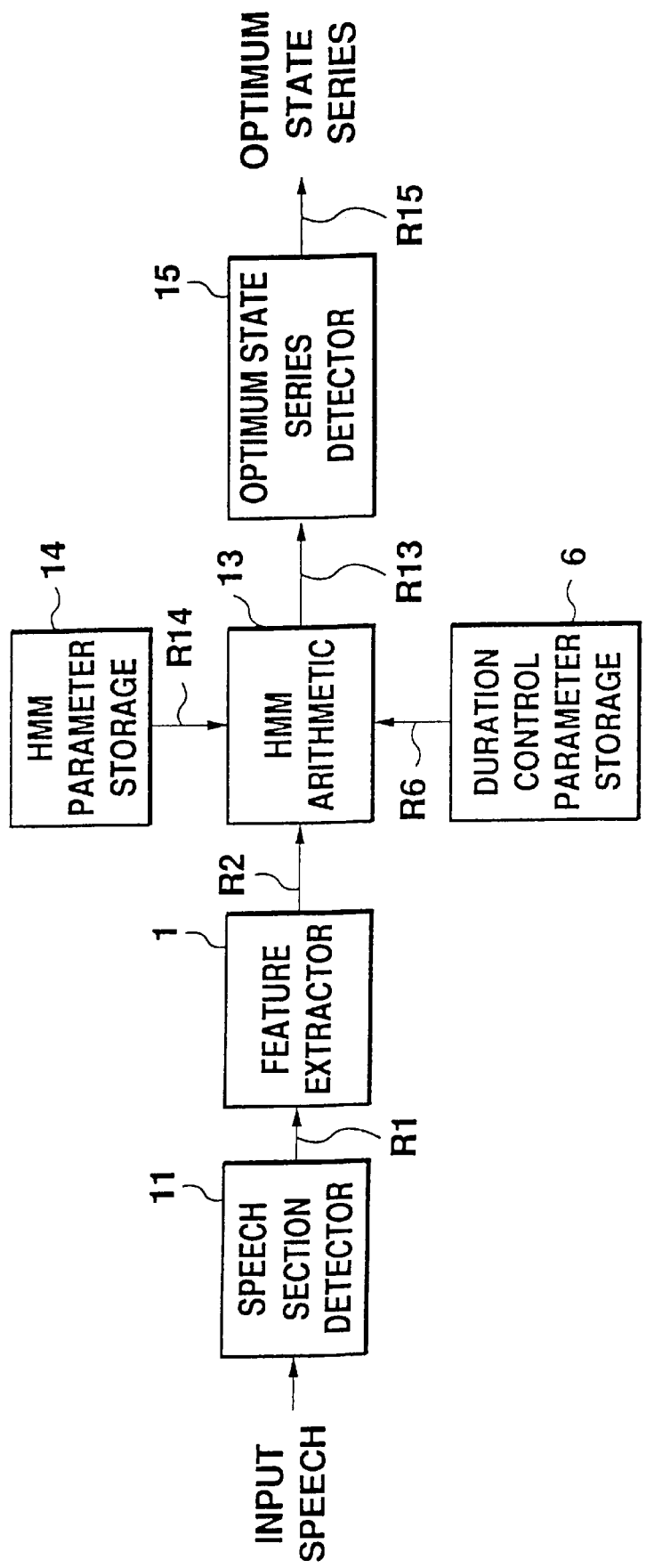
FIG. 38 is a block diagram of another conventional speech recognition apparatus.
Figure 39:
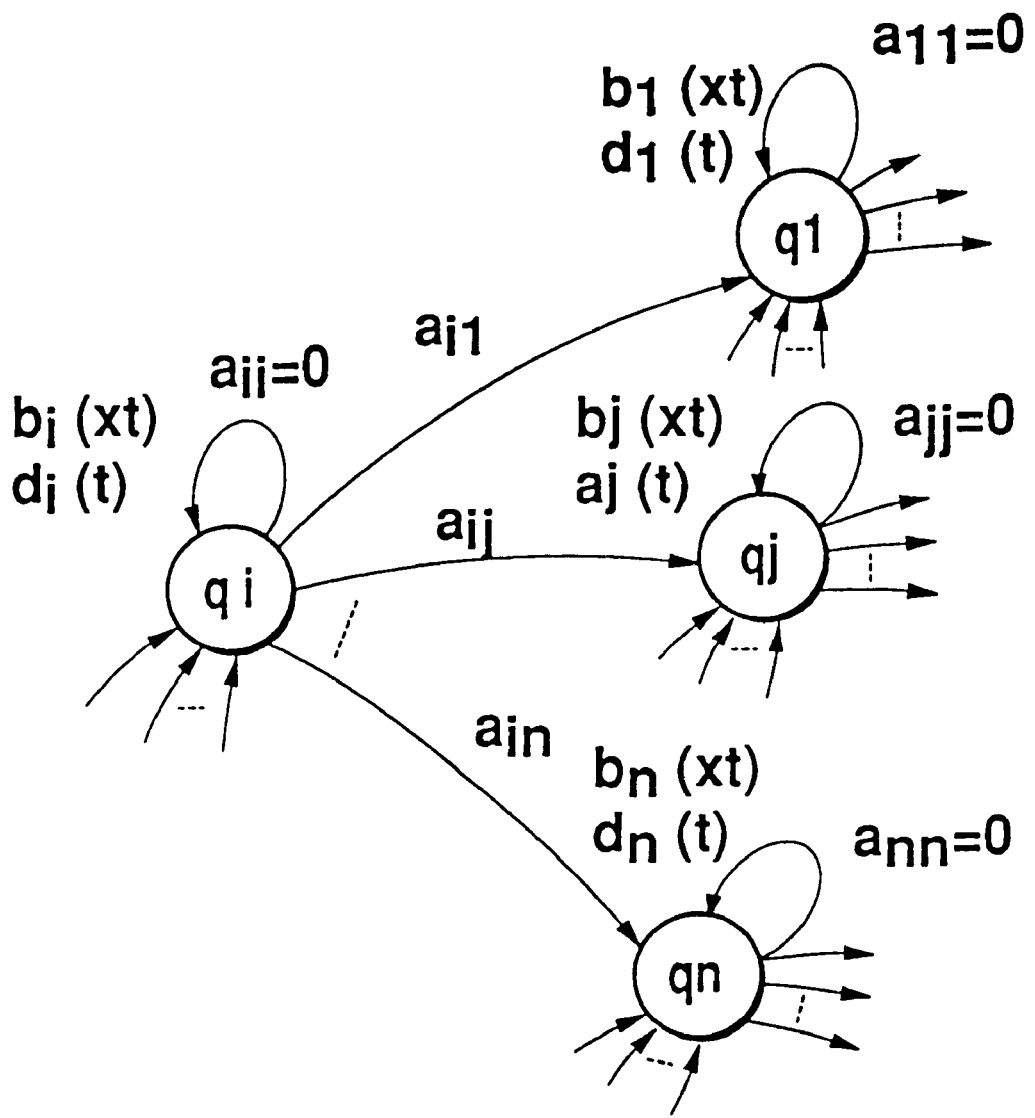
FIG. 39 is a schematic view showing a structure of an HMM in the apparatus shown in FIG. 38.

In this embodiment, in order to promote the interstate transition as the formation of the boundaries of the phonetic model series, although the score value is given at the phonetic boundaries or in their periphery in the fourth and the fifth embodiments, the promotion is given in proportion to the boundary likelihood time series R70201 to R70214 output from the boundary likelihood calculators 70201 to 70214 of the boundary detector 7. More specifically, in the boundary time estimators 70301 to 70314, the variable $C_k(t)$ is set to formula (26) (wherein ε is a proportional coefficient) and step S306 shown in FIG. 24 or step S306C shown in FIG. 32 is replaced with step S306D shown in FIG. 34. That is, the HMM calculation is executed according to recurrence formula (27).

$$C_k(t) = \begin{cases} \varepsilon \times \gamma_k(B_t) & \text{(boundary or boundary area)} \\ 0 & \text{(the others)} \end{cases} \quad (26)$$

$$\alpha(j, t) = \max_{1 \leq i \leq n} \begin{cases} \alpha(i, t-1)a_{ij}b_j(x_t) & (i = j) \\ \alpha(i, t-1)a_{ij}b_j(x_t)\exp(C_{k(i,j)}) & (i \neq j \ \& \ C_{ij}(t) > 0) \\ 0 & \text{(the others)} \end{cases} \quad (27)$$

FIG. 35 shows the evaluation result in this embodiment. The not clearly described experimental conditions are the same as the evaluation experiment in the third embodiment. In FIG. 35, when $a_{ij}=1/n_i$ and the proportional coefficient ε=0.1, the minimum error rate 7.2% is obtained. This value is better than any of the third to the sixth embodiments. As described above, in the interstate transition within at the phonetic boundaries in the estimated speech or within the areas near the phonetic boundaries, the score proportional to the likelihood of the boundaries obtained as a by-product of the estimation of the boundaries, and the interstate transition as the formation of the phonetic model series is promoted. The effects of this method can be confirmed.

In the above-description, although the Viterbi algorithm is used in the HMM calculation, of course, the present invention can be applied to the HMM on the basis of the formulation shown in formula (28) in which the maximizing calculation max is replaced with the sum Σ in the Viterbi algorithm (but, it is necessary to detect the optimum state series on the basis of the Viterbi algorithm.)

$$\alpha(j, t) = \sum_{1 \leq i \leq n} \{\alpha(i, t-1)a_{ij}b_j(x_t)\} \quad (28)$$

Further, in all of the above descriptions, although the probability distribution of the fixed length segments as the boundary detector has been used, by using other conventional techniques, for example, a method for detecting phonetic boundaries of a phonetic unit, as disclosed in the document ("Phonemic Units Segmentation in Various Phonetic Environments", Electronic Information Communications Association of Japan Transactions D-II Vol. J72-D-II, No. 8, pp. 1221–1227, August 1989), of course, the present invention can be realized (but, the boundary likelihood can not be used.). Moreover, in the above description, although 29 kinds of phonemes are made to correspond each to one state of the HMM as the phonetic model series, the number of the phonemes is not restricted to this number and the number of the states allocated to the phonemes is also not restricted to this number. Furthermore, it is not necessary to use the HMM as the phonetic model, for example, a linear phoneme context-sensitive phonetic model, as disclosed in the document ("Speech recognition using a time-dependent linear phonetic-context model", Acoustical Society of Japan Proceedings, 2-P-27, March 1990) can be used.

As described above, according to the boundary estimation method of the speech recognition of the present invention, since the distribution of the features corresponding to the boundaries in the speech is applied to the model of the probability distribution whose method of design is established to perform the estimation, a method whose design is easy and the likelihood corresponding to the probability can be directly obtained.

Further, according to the speech recognition apparatus of the present invention, in addition to providing a feature extractor for converting an input speech into time series feature parameters and a boundary detector for detecting phonetic boundary equivalent areas in the input speech from the time series feature parameters, any of several approaches may be implemented. First, when phonetic model series are applied to the time series feature parameters, a model arithmetic means restricts a time when a transition of the phonetic model series occurs to a phonetic boundary equivalent range in the input speech. Secondly, when the phonetic model series are applied to the time series feature parameters, the model arithmetic means promotes so as to cause the transition of the phonetic model series within the phonetic boundary equivalent areas in the input speech. Thirdly, the model arithmetic means is composed of these members. Fourthly, in the estimation of the phonetic boundaries, the boundary detector can obtain the likelihood of the phonetic boundaries at the same time and the model arithmetic means promotes in proportion to the likelihood of the phonetic boundaries so as to cause the transition of the phonetic model series within the phonetic boundary equivalent areas. Thus high precision can be obtained without providing any duration restriction. Also, by disusing the duration restriction, the model calculation can be simplified compared with the conventional method.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A boundary estimation method of speech recognition comprising the steps of:
   (a) analyzing an input speech sample to extract a time window of speech parameters.
   (b) calculating a first probability that a phonetic boundary of the input speech exists at a center of the time window;
   (c) calculating a second probability that the phonetic boundary of the input speech does not exist at the center of the time window; and
   (d) calculating a value indicative of the likelihood that the phonetic boundary of the speech exists at the center of the time window on the basis of the first probability and the second probability.

2. The boundary estimation method of claim 1, further comprising steps performed prior to step (a), of:
   receiving, in a learning mode, a plurality of learning samples;
   classifying each of the plurality of learning samples as one of a boundary sample and a non-boundary sample; and
   applying a model of a probability distribution to the boundary samples and the non-boundary samples to estimate a parameter of the probability distribution.

3. The boundary estimation method of claim 2, wherein the step (b) includes the step of calculating the first probability on the basis of the parameter of the probability distribution applied to the non-boundary samples, and the step (c) includes a step of calculating the second probability on the basis of the parameter of the probability distribution applied to the boundary samples.

4. The boundary estimation method of claim 3, wherein the samples, the first probability and the second probability are defined as $B_t$, $Pr_1(B_t)$ and $Pr_2(B_t)$, respectively, and the step (d) includes a step of determining a degree of existence of a phonetic boundary of speech at the center of the time window to be equal to $Pr_1(B_t)/Pr_2(B_t)$.

5. The speech recognition method of claim 1, wherein step (b) includes determining a probability that a center of the time window corresponds to one of a predetermined plurality of phonetic boundaries.

6. The speech recognition method of claim 5, further comprising the steps, performed prior to step (a), of:
   receiving, in a learning mode, a plurality of learning samples;
   classifying each of the plurality of learning samples as one of a predetermined plurality of phonetic boundaries; and
   applying a model of a probability distribution to the plurality of learning samples to estimate a parameter of the probability distribution for each of the predetermined plurality of phonetic boundaries;
   and wherein the step of determining includes calculating the probability based upon the parameter of the probability distribution.

7. A speech recognition apparatus, comprising:
   feature extracting means for converting a sample of input speech to a series of feature parameters;
   boundary detecting means for detecting phonetic boundary areas in the sample of input speech based upon the series of feature parameters, the boundary detecting means including:
      an analyzer for extracting a time window from the series of speech parameters;
      a first calculator for calculating a first probability of existence of a boundary of the input speech at a center of the time window;
      a second calculator for calculating a second probability of nonexistence of the boundary of the input speech at the center of the time window; and
      a detector for detecting either the phonetic boundaries in the input speech or the areas near the phonetic boundaries by calculating a degree of existence of the boundaries of the speech at the center of the time window on the basis of a calculation including the first probability and the second probability;
   model arithmetic means for determining a phonetic series which matches the input speech by restricting times when boundaries of a plurality of phonetic models are formed based upon the phonetic boundary areas detected by the boundary detecting means, and for determining probabilities respectively corresponding to the boundary areas; and
   phonetic series transform means for selecting a suitable phonetic model series corresponding to the input speech based upon the probabilities determined by the model arithmetic means.

8. The speech recognition apparatus of claim 7, wherein:
   the boundary detecting means includes a likelihood calculator for simultaneously calculating a likelihood of one phonetic boundary area when detecting the one phonetic boundary area;
   the model arithmetic means includes a promoter for promoting the occurrence of a phonetic transition of the phonetic model series in the phonetic boundary areas when preparing the phonetic model series corresponding to the feature parameters; and
   means for proportioning a promotion rate of the promoter to the likelihood of the phonetic boundaries obtained by the boundary detecting means.

9. The speech recognition apparatus of claim 7, wherein the model arithmetic means includes:
   a promoter for promoting the occurrence of a phonetic transition of the phonetic model series in the phonetic boundary areas; and
   means for restricting the phonetic transition to the phonetic boundary areas by determining the probabilities respectively corresponding to the boundary areas detected by the boundary detecting means.

10. The apparatus of claim 7, wherein the boundary detecting means includes means for detecting a plurality of phonetic boundaries and a plurality of areas near the phonetic boundaries.

11. The speech recognition apparatus of claim 7, wherein the boundary detecting means includes:
   an analyzer for extracting a time window from the series of speech parameters; and
   means for determining a probability that a center of the time window corresponds to one of a predetermined plurality of phonetic boundaries.

12. An apparatus for performing boundary estimation of speech, comprising:
   a feature extractor, having an input that receives an input speech series, and an output that provides a series of feature values that correspond to the input speech series;
   a first probability calculator, having an input that receives the feature values and an output that provides a first probability indicative of a likelihood that a speech boundary exists within the input speech series; and
   a second probability calculator, having an input that receives the feature values and an output that provides a second probability indicative of a likelihood that a speech boundary does not exist within the input speech series; and
   a likelihood calculator, having a first input coupled to the first probability calculator, a second input coupled to the second probability calculator, and an output that provides a likelihood that a speech boundary exists within the input speech series based upon the first probability and the second probability.

13. The apparatus of claim 12, wherein the output of the likelihood calculator is equal to a value received at the first input divided by a value received at the second input.

14. The apparatus of claim 12, further comprising:
   a first parameter storage element, coupled to the first probability detector, that stores a first plurality of parameters of a probability density function relating to the likelihood that a speech boundary exists;
   a second parameter storage element, coupled to the second probability detector, that stores a second plurality of parameters of the probability density function; and wherein:
      the first probability calculator calculates the first probability based upon the feature values and the first plurality of parameters; and
      the second probability calculator calculates the second probability based upon the feature values and the second plurality of parameters.

15. A speech recognition method, comprising the steps of:
   converting a sample of input speech to a series of feature parameters;
   detecting phonetic boundary areas in the sample of input speech based upon the series of feature parameters;
   determining a phonetic series which matches the input speech based upon the phonetic boundary areas detected by restricting times when boundaries of a plurality of phonetic models are formed and determining probabilities respectively corresponding to the phonetic boundary areas; and
   selecting a suitable phonetic model series corresponding to the input speech based upon the probabilities corresponding to the phonetic boundary areas;
   wherein the step of detecting boundary areas includes the steps of:
      extracting a time window from the series of speech parameters;
      calculating a first probability that a phonetic boundary of the input speech exists at a center of the time window;
      calculating a second probability that the phonetic boundary of the input speech does not exist at the center of the time window;
      calculating a value indicative of the likelihood that the boundary of the speech exists at the center of the time window on the basis of the first probability and the second probability;
      detecting a phonetic boundary area based upon the value indicative of the likelihood.

16. The speech recognition method of claim 15, further comprising the steps, performed prior to the step of extracting, of:
   receiving, in a learning mode, a plurality of learning samples;
   classifying each of the plurality of learning samples as one of a boundary sample and a non-boundary sample; and
   applying a model of a probability distribution to the boundary samples to estimate a first parameter of the probability distribution; and
   applying the model of a probability distribution to the non-boundary samples to estimate a second parameter of the probability distribution;
   and wherein the step of calculating the first probability is performed based upon the first parameter, and the step of calculating a second probability are performed based upon the second parameter.

17. A speech recognition method, comprising the steps of:
   converting a sample of input speech to a series of feature parameters;
   detecting phonetic boundary areas in the sample of input speech based upon the series of feature parameters;
   determining a phonetic series which matches the input speech based upon the phonetic boundary areas detected by restricting times when boundaries of a plurality of phonetic models are formed and determining probabilities respectively corresponding to the phonetic boundary areas; and
   selecting a suitable phonetic model series corresponding to the input speech based upon the probabilities corresponding to the phonetic boundary areas;
   wherein the step of detecting boundary areas includes the steps of:
      extracting a time window from the series of speech parameters;
      calculating a probability that a center of the time window corresponds to one of a predetermined plurality of phonetic boundaries.

18. The speech recognition method of claim 17, further comprising the steps, performed prior to the step of extracting, of:

receiving, in a learning mode, a plurality of learning samples;

classifying each of the plurality of learning samples as one of a predetermined plurality of phonetic boundaries; and applying a model of a probability distribution to the plurality of learning samples to estimate a parameter of the probability distribution for each of the predetermined plurality of phonetic boundaries;

and wherein the step of calculating includes calculating the probability based upon the parameter of the probability distribution.

* * * * *

UNITED STATES PATENT AND TRADEMARK OFFICE
CERTIFICATE OF CORRECTION

PATENT NO : 5,940,794
DATED : August 17, 1999
INVENTOR(S): Yoshiharu ABE

It is certified that error appears in the above-identified patent and that said Letters Patent is hereby corrected as shown below:

Title page should read as follows:

Item [75] Inventor:     Yoshiharu Abe, Kanagawa, Japan

Signed and Sealed this

Twelfth Day of December, 2000

Attest:

Q. TODD DICKINSON

*Attesting Officer*     *Director of Patents and Trademarks*